United States Patent
Prasad et al.

(10) Patent No.: US 10,230,507 B2
(45) Date of Patent: Mar. 12, 2019

(54) SIGNALLING IN COORDINATED MULTI-POINT TRANSMISSION AND RECEPTION (COMP)

(71) Applicant: NEC Corporation, Tokyo (JP)

(72) Inventors: Narayan Prasad, Willow Grove, PA (US); Mohammad Khojastepour, Lawrenceville, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/856,292

(22) Filed: Sep. 16, 2015

(65) Prior Publication Data
US 2016/0094320 A1 Mar. 31, 2016

Related U.S. Application Data

(60) Provisional application No. 62/150,178, filed on Apr. 20, 2015, provisional application No. 62/204,541, (Continued)

(51) Int. Cl.
*H04W 4/00* (2018.01)
*H04L 5/00* (2006.01)
(Continued)

(52) U.S. Cl.
CPC .......... *H04L 5/0035* (2013.01); *H04L 5/0053* (2013.01); *H04L 5/0073* (2013.01);
(Continued)

(58) Field of Classification Search
CPC ... H04L 5/0035; H04L 5/0053; H04L 5/0073; H04L 5/0094; H04W 52/243;
(Continued)

(56) References Cited

U.S. PATENT DOCUMENTS

| 8,995,400 B2 | 3/2015 | Geirhofer et al. |
| 9,125,197 B2 | 9/2015 | Liao et al. |

(Continued)

FOREIGN PATENT DOCUMENTS

| CN | 101960737 A | 1/2011 |
| CN | 102696256 A | 9/2012 |

(Continued)

OTHER PUBLICATIONS

Non-Final Office Action dated Aug. 8, 2016, in U.S. Appl. No. 14/661,236.
(Continued)

*Primary Examiner* — Abdelnabi O Musa
(74) *Attorney, Agent, or Firm* — Finnegan, Henderson, Farabow, Garrett & Dunner, L.L.P.

(57) ABSTRACT

In a wireless communications system including a first base station and a second base station, a wireless communications method implemented in the first base station supporting coordinated multi-point transmission and reception (CoMP) is disclosed. The wireless communications method comprises receiving from the second base station an information element (IE) indicating multiple relative narrowband Tx (transmit) power (RNTP) thresholds, and performing interference aware scheduling. Other methods, systems, and apparatuses also are disclosed.

9 Claims, 1 Drawing Sheet

Related U.S. Application Data filed on Aug. 13, 2015, provisional application No. 62/145,580, filed on Apr. 10, 2015, provisional application No. 62/161,804, filed on May 14, 2015, provisional application No. 62/145,251, filed on Apr. 9, 2015, provisional application No. 62/056,095, filed on Sep. 26, 2014, provisional application No. 62/162,285, filed on May 15, 2015, provisional application No. 62/076,873, filed on Nov. 7, 2014, provisional application No. 62/110,006, filed on Jan. 30, 2015, provisional application No. 62/151,796, filed on Apr. 23, 2015, provisional application No. 62/076,221, filed on Nov. 6, 2014, provisional application No. 62/055,381, filed on Sep. 25, 2014.

(51) Int. Cl.
*H04W 52/24* (2009.01)
*H04W 72/04* (2009.01)
*H04W 52/14* (2009.01)
*H04W 52/22* (2009.01)
*H04W 72/12* (2009.01)

(52) U.S. Cl.
CPC ......... *H04L 5/0094* (2013.01); *H04W 52/243* (2013.01); *H04W 72/0426* (2013.01); *H04W 52/143* (2013.01); *H04W 52/226* (2013.01); *H04W 52/247* (2013.01); *H04W 72/1226* (2013.01)

(58) Field of Classification Search
CPC ........... H04W 72/0426; H04W 52/143; H04W 52/226; H04W 52/247
See application file for complete search history.

(56) References Cited

U.S. PATENT DOCUMENTS

| | | |
|---|---|---|
| 9,385,791 B2 | 7/2016 | Etemad et al. |
| 2012/0282934 A1 | 11/2012 | Simonsson et al. |
| 2012/0287799 A1 | 11/2012 | Chen et al. |
| 2012/0327908 A1 | 12/2012 | Gupta et al. |
| 2013/0028109 A1 | 1/2013 | Jongrren et al. |
| 2013/0058307 A1 | 3/2013 | Kim et al. |
| 2013/0077513 A1 | 3/2013 | Ng et al. |
| 2013/0114427 A1 | 5/2013 | Maattanen et al. |
| 2013/0114517 A1 | 5/2013 | Blankenship et al. |
| 2013/0115989 A1 | 5/2013 | Yamazaki et al. |
| 2013/0156001 A1 | 6/2013 | Gomadam |
| 2013/0196675 A1 | 8/2013 | Xiao et al. |
| 2013/0208678 A1* | 8/2013 | Zhang ............... H04L 5/0053 370/329 |
| 2013/0242748 A1 | 9/2013 | Mangalvedhe et al. |
| 2013/0242902 A1 | 9/2013 | Liu et al. |
| 2013/0267268 A1 | 10/2013 | Lee et al. |
| 2013/0303180 A1 | 11/2013 | Wang et al. |
| 2013/0322376 A1 | 12/2013 | Marinier et al. |
| 2013/0336214 A1 | 12/2013 | Sayana et al. |
| 2014/0036664 A1 | 2/2014 | Han et al. |
| 2014/0073313 A1 | 3/2014 | Hammarwall et al. |
| 2014/0078989 A1 | 3/2014 | Guo et al. |
| 2014/0192759 A1* | 7/2014 | Son .................. H04W 72/042 370/329 |
| 2014/0226612 A1 | 8/2014 | Kim et al. |
| 2014/0254531 A1* | 9/2014 | Lee .................... H04L 5/006 370/329 |
| 2014/0254708 A1 | 9/2014 | Seo et al. |
| 2014/0269300 A1 | 9/2014 | Bennis |
| 2014/0293843 A1 | 10/2014 | Papasakellariou et al. |
| 2015/0049626 A1 | 2/2015 | Chen et al. |
| 2015/0063222 A1 | 3/2015 | Wang et al. |
| 2015/0063287 A1 | 3/2015 | Mazzarese et al. |
| 2015/0200757 A1 | 7/2015 | Wu et al. |
| 2015/0215934 A1* | 7/2015 | Davydov ............ H04B 7/0456 370/329 |
| 2015/0237620 A1 | 8/2015 | Jongren et al. |
| 2015/0349908 A1 | 12/2015 | Centonza et al. |
| 2016/0037511 A1 | 2/2016 | Vincze et al. |
| 2016/0037541 A1* | 2/2016 | Kim .................... H04W 72/085 370/329 |
| 2016/0044650 A1 | 2/2016 | Enescu et al. |
| 2016/0119037 A1 | 4/2016 | Won et al. |
| 2016/0150512 A1 | 5/2016 | Zhang et al. |
| 2016/0218841 A1* | 7/2016 | Centonza ............ H04J 11/0053 |
| 2017/0237535 A1 | 8/2017 | Park et al. |

FOREIGN PATENT DOCUMENTS

| | | |
|---|---|---|
| CN | 103650379 A | 3/2014 |
| JP | 2003-29970 | 1/2003 |
| JP | 2011-530133 | 12/2011 |
| JP | 2014-530551 A | 11/2014 |
| KR | 10-2013-0101294 | 9/2013 |
| KR | 10-2014-0099265 | 8/2014 |
| RU | 2 387 082 C2 | 12/2006 |
| WO | WO 02/093819 A1 | 11/2002 |
| WO | WO 03/019813 A1 | 3/2003 |
| WO | WO 2010/129400 A1 | 11/2010 |
| WO | WO 2011/083774 A1 | 7/2011 |
| WO | WO 2013/044808 A1 | 4/2013 |
| WO | WO 2013/118567 A1 | 8/2013 |
| WO | WO 2013/137796 A1 | 9/2013 |
| WO | WO 2014/021610 A1 | 2/2014 |
| WO | WO 2014/115374 A1 | 7/2014 |
| WO | WO 2014/139588 A1 | 9/2014 |
| WO | WO 2015/032802 A1 | 3/2015 |
| WO | WO 2016/021880 A1 | 2/2016 |

OTHER PUBLICATIONS

Samsung, "New Work item on Enhanced Signalling for Inter-eNB CoMP", 3GPP TSG RAN Meeting #64, RP-141032, pp. 1-6, Jun. 2014.
Samsung, "Way forward on WI: Enhanced signalling for inter-eNB CoMP", 3GPP TSG-RAN WG3 #85bis, R3-142582, Oct. 2014.
NEC, "Signaling Considerations for Inter-eNB CoMP", 3GPP TSG RAN WG1 Meeting #76bis, R1-141206, pp. 1-6, Apr. 2014.
Samsung, "Introduction of enhanced inter-eNB CoMP signalling", 3GPP TSG-RAN WG3 Meeting #88, R3-151209, pp. 1-18, May 2015.
Samsung, WI kickoff: Enhanced signalling for inter-eNB CoMP, 3GPP TSG-RAN WG3 #85, R3-141753, pp. 1-5, Aug. 2014.
Samsung, "Introduction of enhanced inter-eNB CoMP signalling", 3GPP TSG-RAN WG3 Meeting #85, R3-141754, pp. 1-13, Aug. 2014.
Ericsson et al., "Proposed solution for eCoMP", 3GPP TSG-RAN3 Meeting #84, R3-141304, pp. 1-7, May 2014.
Samsung, "Definition of UE ID and semantics TP", 3GPP TSG-RAN WG3 #85, R3-141989, pp. 1-2, Aug. 2014.
Ericsson, "Inter eNB CoMP Technical Aspects: the fall of FFSs", 3GPP TSG-RAN3 Meeting #84, R3-141880, pp. 1-6, Aug. 2014.
Samsung, "Way forward on WI: Inter-eNB CoMP for LTE in RAN3#85", 3GPP TSG-RAN WG3 #85, R3-142107, p. 1, Aug. 2014.
Qualcomm Incorporated, "Introduction of inter-eNB CoMP", 3GPP TSG-RAN WG3 Meeting #85, R3-141749, pp. 1-19, Aug. 2014.
Written Opinion and Search Report dated Feb. 23, 2016, in related PCT International Patent Application No. PCT/US2015/050554.
Written Opinion and Search Report dated Feb. 23, 2016, in counterpart PCT International Patent Application No. PCT/US2015/050555.
Written Opinion and Search Report dated Feb. 26, 2016, in related PCT International Patent Application No. PCT/US2015/050557.
Alcatel-Lucent, "Performance Evaluation of X2 signalling Supporting DL eCoMP with NIB", 3GPP TSG RAN WG1 Meeting #75, R1-135179, pp. 1-7, Nov. 2013.

(56) References Cited

OTHER PUBLICATIONS

Korean Office Action dated Nov. 10, 2016, by the Korean Patent Office in counterpart Korean Patent Application No. 10-2016-7024154.
Non-Final Office Action dated Sep. 22, 2016, in U.S. Appl. No. 14/661,036.
Japanese Office Action issued by the Japanese Patent Office in counterpart Japanese Patent Application No. 2016-558047, dated Feb. 21, 2017.
Sung Hwan Won, "Status Report to TSG", Intere-NB CoMP for LTE, 3GPP TSG RAN meeting #63, RP-140053, pp. 1-6, Mar. 6, 2014.
Japanese Official Action issued by the Japanese Patent Office in counterpart Japanese Patent Application No. 2016-565143, dated Apr. 18, 2017.
Samsung, "WI kickoff: Enhanced signaling for inter-eNB CoMP", 3GPP, TSG-RAN WG3 #85, R3-141753, 5 pages, (2014).
NTT DOCOMO, "Details on Backhaul Signaling for Inter-eNB CoMP", 3GPP, TSG-RAN WG1 Meeting #76bis. R1-141471, pp. 1-4, (2014).
Non-Final Office Action dated Jan. 10, 2017, in U.S. Appl. No. 14/856,310.
Non-Final Office Action dated Jan. 9, 2017, in U.S. Appl. No. 14/856,284.
NSN et al., "Simulation Results for CoMP scenario.2 with non-ideal backhaul", Discussion and Decision. 3GPP TSG-RAN WG1 Meeting #75, R1-136023, Agenda item: 6.2.9.1. 6 pages. (2013).
Alcatel-Lucent et al., "Proposed signalling information supporting eCoMP with NIB", Discussion/Decision, 3GPP TSG RAN WG1 Meeting #76, R1-140168, Agenda Item: 7.2.6, 6 pages. (2014).
Samsung, "Use of SRS received power for Inter-eNB CoMP", Discussion and Decision, 3GPP TSG RAN WG1 Meeting #76, R1-140379, Agenda Item: 7.2.6, 5 pages, (2014).
NEC, "Signaling Considerations for CoMP with non-ideal backhaul", 3GPP TSG RAN WG1 Meeting #76, R1-140421, Agenda Item: 7.2.6, pp. 1-6, (2013).
ZTE, "Remaining details on inter-eNB CoMP Signalling", Discussion and Decision, 3GPP TSG RAN WG1 Meeting #76bis, R1-141406, Agenda Item: 7.2.6, 4 pages, (2014).
Alcatel-Lucent, et al., "Signalling Details and Procedures Supporting eCoMP" Discussion/Decision, 3GPP TSG RAN WG1 Meeting #76bis, R1-141725, Agenda Item: 7.2.6, 9 pages, (2014).
RAN1, "LS on Inter-eNB CoMP for LTE", 3GPP TSG RAN WG1 Meeting #76bis, R1-141816, Release 12, 2 pages, (2014).
Samsung, "Introduction of Inter-eNB CoMP", 3GPP TSG-RAN WG3 Meeting #84, R3-141487, 2 pages, (2014).
Zhang, et al. "Weighted Sum-Rate Maximization in Multi-Cell Networks via Coordinated Scheduling and Discrete Power Control", IEEE Journal on Selected Areas in communications, vol. 29, No. 6, (2001).
International Search Report dated Jun. 12, 2015, in corresponding PCT International Application No. PCT/US2015/021369.
International Search Report dated May 28, 2015, in corresponding PCT International Application No. PCT/US2015/021372.
Notice of Allowance for Patent dated Mar. 24, 2017, by the Korean Intellectual Property Office in counterpart Korean Patent Application No. 10-2016-7025283.
Notification of Reasons for Refusal dated Feb. 21, 2017, in corresponding Japanese Patent Application No. 2016-558047.
Supplementary European Search Report issued by the European Patent Office in counterpart European Patent Application No. 15 84 4687, dated Aug. 17, 2017.

Notification of Reasons for Refusal dated Oct. 3, 2017, In corresponding Japanese Patent Application No. 2017-507948.
NSN, "Signalling framework for inter-eNB CoMP based on Coordinated Muting", 3GPP Draft, R3-140181, 3rd Generation Partnershi P Project ( 3GPP), Mobile Competence Centre, 3GPP TSG-RAN WG3, Meeting #83, XP050738622, 11 pages, (2014).
NSN, "X2AP support for Inter-eNB CoMP", 3GPP Draft, R3-141184, 3rd Generation Partnershi P Project ( 3GPP), Mobile Competence Centre, 3GPP TSG-RAN3, Meeting #84, XP050795734, 12 pages, (2014).
Extended European Search Report dated Oct. 11, 2017, issued in related European Patent Application No. 15764646.4.
Official Action dated Oct. 12, 2017, issued by the Russian Patent Office in counterpart Russian Patent Application No. 2016140853.
Non-Final Office Action dated Jul. 13, 2017 in related U.S. Appl. No. 14/661,236.
Notification of Reasons for Refusal dated Aug. 8, 2017, by the Japanese Patent Office in counterpart Japanese Patent Application No. 2016-557306.
Qualcomm Incorporated, "Parameters for Backhaul Signaling", 3 GPP TSG-RAN WG1 #76,R1-140456 Feb. 10, 2014.
Alcatel-Lucent et al., "Introduction of Enhanced RNTP and UE-CSI Reporting", 3GPP TSG RAN WG3 Meeting #85, R3-141834, Aug. 17, 2014.
Alcatel-Lucent et al., "Introduction of Signaling for US-CSI Information", 3GPP TSG RAN WG3 Meeting #85, R3-141835, Aug. 17, 2014.
Nokia Works, "Test Proposal for Subband Definition", 3GPP TSG RAN WG3 Meeting #88. R3-151211, May 29, 2015 (Applicant notes that this document is incorrectly labeled R3-151208).
Alcatel-Lucent, "Signalling Details and Procedures Supporting eCoMP", 3GPP TSG RAN WG1 Meeting #76bis, R1-141725, Mar. 31-Apr. 4, 2017.
Extended European Search Report dated Oct. 4, 2017, issued in related European Patent Application No. 15843576.8.
Alcatel-Lucent,Alcatel-Lucent Shanghai Bell, "Proposals for eCoMP Stage3 CR", 3GPP TSG RAN WG3 Meeting#85, R3-141633. Dresden, Germany, Aug. 18-22, 2014.
Notification of Reasons for Refusal dated Aug. 7, 2018 and an English-language machine translation, issued by the Japanese Patent Office in counterpart Japanese Patent Application No. 2017-507948.
Notification of Reasons for Refusal dated Jun. 26, 2018, by Japanese Patent Office in counterpart Japanese Patent Application 2017-178902.
"Introduction of Inter-eNB CoMP Signalling", 3GPP TSG-RAN WG3 Meeting #84, R3-141412, 14 pages, (May 2014).
"Discussion on Stage 3 Completion for Inter-eNB CoMP", 3GPP TSG-RAN WG3 #83, R3-141139, 5 pages, (May 2014).
"Signaling Framework for Inter-eNB CoMP", 3GPP TSG-RAN WG3 Meeting #84, R3-141183, 7 pages, (May 2014).
Notification of Reasons for Reasons for Refusal dated Jul. 3, 2018, by Japanese Patent Office in counterpart Japanese Patent Application No. 2017-088564.
Chinese Office Action dated Sep. 4, 2018, issued by the State Intellectual Property Office of People's Republic of China Patent Office in counterpart Chinese Patent Application No. 201580014066.9.
European Office Action issued by the European Office Action in counterpart European Patent Application No. 15 764 646.4, dated Dec. 21, 2018.

\* cited by examiner

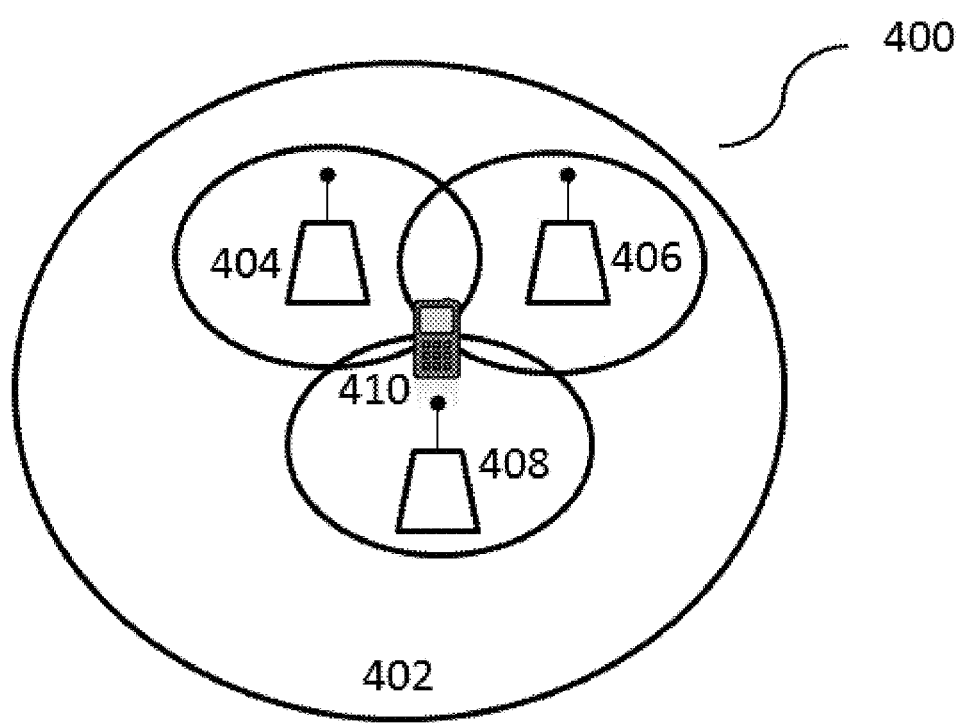

SIGNALLING IN COORDINATED MULTI-POINT TRANSMISSION AND RECEPTION (COMP)

This application claims the benefit of U.S. Provisional Application No. 62/055,381, entitled "Signalling for Inter-eNB CoMP," filed on Sep. 25, 2014, U.S. Provisional Application No. 62/056,095, entitled "Signalling for Inter-eNB CoMP," filed on Sep. 26, 2014, U.S. Provisional Application No. 62/076,221, entitled "CSI Exchange for Inter-eNB CoMP," filed on Nov. 6, 2014, U.S. Provisional Application No. 62/076,873, entitled "CSI Exchange for Inter-eNB CoMP," filed on Nov. 7, 2014, U.S. Provisional Application No. 62/110,006, entitled "CSI Exchange for Inter-eNB CoMP," filed on Jan. 30, 2015, U.S. Provisional Application No. 62/145,251, entitled "Efficient CSI and e-RNTP Exchange for Inter-eNB CoMP," filed on Apr. 9, 2015, U.S. Provisional Application No. 62/145,580, entitled "Efficient CSI and e-RNTP Exchange for Inter-eNB CoMP," filed on Apr. 10, 2015, U.S. Provisional Application No. 62/150,178, entitled "CSI Exchange for Inter-eNB CoMP," filed on Apr. 20, 2015, U.S. Provisional Application No. 62/151,796, entitled "Subband Definitions and eRNTP enhancements," filed on Apr. 23, 2015, U.S. Provisional Application No. 62/161,804, entitled "On the Subband Definition in CSI Signaling," filed on May 14, 2015, U.S. Provisional Application No. 62/162,285, entitled "eRNTP Signalling for Inter-eNB CoMP," filed on May 15, 2015, U.S. Provisional Application No. 62/204,541, entitled "Subband definition in CSI Signaling," filed on Aug. 13, 2015, the contents of all of which are incorporated herein by reference.

BACKGROUND OF THE INVENTION

The present invention relates to coordinated multi-point transmission and reception (CoMP) in wireless or mobile communications and, more particularly, to signalling in inter-eNB (E-UTRAN NodeB or eNodeB) CoMP.

Referring now to FIG. 1, a CoMP mobile communications system 400 comprising a CoMP coordination zone or area or CoMP cooperating set 402 in which the embodiments may be implemented is illustrated. One or more user equipments (UEs) 410 are served by one or more TPs or cells 404 to 408. TPs 404 to 408 can be base stations or eNBs. Each of the user equipments includes e.g. a transmitter and a receiver, and each of the base stations or eNBs 104 includes e.g. a transmitter and a receiver.

Transmission layers are sometimes called "transmit layers" or "layers." The number of transmission layers is known as "transmission rank" or "rank." A codebook is a set of precoding matrices or precoders. A precoding matrix is also known as a codeword.

REFERENCE

[1] RP-141032, "New Work Item on Enhanced Signaling for Inter-eNB CoMP," June 2014.
[2] R3-142582, "Way forward on WI: Enhanced signalling for inter-eNB CoMP," October 2014.
[3] R1-141206, "Signaling Considerations for Inter-eNB CoMP", NEC, March 2014.
[4] R3-151209, Change Request, May 2015.

BRIEF SUMMARY OF THE INVENTION

An objective of the present invention is to provide efficient channel state information (CSI) and/or relative narrowband Tx (transmit) power (RNTP) exchanges between eNBs.

An aspect of the present invention includes, in a wireless communications system including a first base station and a second base station, a wireless communications method implemented in the first base station supporting coordinated multi-point transmission and reception (CoMP). The wireless communications method comprises, for a given user equipment (UE) identification (ID) and a given channel state information (CSI) process, receiving from the second base station a plurality of CSI reports each of which comprises a rank indication (RI) and a channel quality indicator (CQI), wherein the second base station receives from one or more user equipments (UEs) RI and CQI information.

Another aspect of the present invention includes, in a wireless communications system including a first base station and a second base station, a wireless communications method implemented in the second base station supporting coordinated multi-point transmission and reception (CoMP). The wireless communications method comprises receiving from one or more user equipments (UEs) rank indication (RI) and channel quality indicator (CQI) information, and for a given user equipment (UE) identification (ID) and a given channel state information (CSI) process, transmitting to the first base station a plurality of CSI reports each of which comprises an RI and a CQI.

Still another aspect of the present invention includes a first base station supporting coordinated multi-point transmission and reception (CoMP) and used in a wireless communications system. The first base station comprises a receiver to receive from a second base station, for a given user equipment (UE) identification (ID) and a given channel state information (CSI) process, a plurality of CSI reports each of which comprises a rank indication (RI) and a channel quality indicator (CQI), wherein the second base station receives from one or more user equipments (UEs) RI and CQI information.

Still another aspect of the present invention includes a second base station supporting coordinated multi-point transmission and reception (CoMP) and used in a wireless communications system. The second base station comprises a receiver to receive from one or more user equipments (UEs) rank indication (RI) and channel quality indicator (CQI) information, and a transmitter to transmit to a first base station, for a given user equipment (UE) identification (ID) and a given channel state information (CSI) process, a plurality of CSI reports each of which comprises an RI and a CQI.

Still another aspect of the present invention includes a wireless communications method implemented in a wireless communications system supporting coordinated multi-point transmission and reception (CoMP) and including a first base station and a second base station. The wireless communications comprises transmitting from one or more user equipments (UEs) to the second base station rank indication (RI) and channel quality indicator (CQI) information, and for a given user equipment (UE) identification (ID) and a given channel state information (CSI) process, transmitting from the second base station to the first base station a plurality of CSI reports each of which comprises an RI and a CQI.

Still another aspect of the present invention includes a wireless communications system supporting coordinated multi-point transmission and reception (CoMP). The wireless communications system comprises a first base station, a second base station transmitting to the first base station, for a given user equipment (UE) identification (ID) and a given channel state information (CSI) process, a plurality of CSI reports each of which comprises a rank indication (RI) and a channel quality indicator (CQI), and one or more user equipments (UEs) transmitting to the second base station RI and CQI information.

An aspect of the present invention includes, in a wireless communications system including a first base station and a second base station, a wireless communications method implemented in the first base station supporting coordinated multi-point transmission and reception (CoMP). The wireless communications method comprises receiving from the second base station an information element (IE) indicating multiple relative narrowband Tx (transmit) power (RNTP) thresholds, and performing interference aware scheduling.

Another aspect of the present invention includes, in a wireless communications system including a first base station and a second base station, a wireless communications method implemented in the second base station supporting coordinated multi-point transmission and reception (CoMP). The wireless communications method comprises transmitting to the first base station an information element (IE) indicating multiple relative narrowband Tx (transmit) power (RNTP) thresholds, wherein the first base station performs interference aware scheduling.

Still another aspect of the present invention includes a first base station supporting coordinated multi-point transmission and reception (CoMP) and used in a wireless communications system. The first base station comprises a receiver to receive from the second base station an information element (IE) indicating multiple relative narrowband Tx (transmit) power (RNTP) thresholds, and a controller to perform interference aware scheduling.

Still another aspect of the present invention includes a second base station supporting coordinated multi-point transmission and reception (CoMP) and used in a wireless communications system. The second base station comprises a transmitter to transmit to the first base station an information element (IE) indicating multiple relative narrowband Tx (transmit) power (RNTP) thresholds, wherein the first base station performs interference aware scheduling.

Still another aspect of the present invention includes a wireless communications method implemented in a wireless communications system supporting coordinated multi-point transmission and reception (CoMP) and including a first base station and a second base station. The wireless communications comprises transmitting from the second base station to the first base station an information element (IE) indicating multiple relative narrowband Tx (transmit) power (RNTP) thresholds, and performing at the first base station interference aware scheduling.

Still another aspect of the present invention includes a wireless communications system supporting coordinated multi-point transmission and reception (CoMP). The wireless communications system comprises a first base station, and a second base station transmitting to the first base station an information element (IE) indicating multiple relative narrowband Tx (transmit) power (RNTP) thresholds, wherein the first base station performs interference aware scheduling.

An aspect of the present invention includes, in a wireless communications system including a first base station and a second base station, a wireless communications method implemented in the first base station supporting coordinated multi-point transmission and reception (CoMP). The wireless communications method comprises receiving, from the second base station, a user equipment (UE) identification (ID) for a UE in a reference signal received power (RSRP) report, and using the UE ID to link the RSRP report with another measurement result for the UE.

Another aspect of the present invention includes, in a wireless communications system including a first base station and a second base station, a wireless communications method implemented in the second base station supporting coordinated multi-point transmission and reception (CoMP). The wireless communications method comprises transmitting, to the first base station, a user equipment (UE) identification (ID) for a UE in a reference signal received power (RSRP) report, wherein the first base station uses the UE ID to link the RSRP report with another measurement result for the UE.

Still another aspect of the present invention includes a first base station supporting coordinated multi-point transmission and reception (CoMP) and used in a wireless communications system. The first base station comprises a receiver to receive, from the second base station, a user equipment (UE) identification (ID) for a UE in a reference signal received power (RSRP) report, and a controller to use the UE ID to link the RSRP report with another measurement result for the UE.

Still another aspect of the present invention includes a second base station supporting coordinated multi-point transmission and reception (CoMP) and used in a wireless communications system. The second base station comprises a transmitter to transmit to the first base station, a user equipment (UE) identification (ID) for a UE in a reference signal received power (RSRP) report, wherein the first base station uses the UE ID to link the RSRP report with another measurement result for the UE.

Still another aspect of the present invention includes a wireless communications method implemented in a wireless communications system supporting coordinated multi-point transmission and reception (CoMP) and including a first base station and a second base station. The wireless communications comprises transmitting, from the second base station to the first base station, a user equipment (UE) identification (ID) for a UE in a reference signal received power (RSRP) report, and using at the first base station the UE ID to link the RSRP report with another measurement result for the UE.

Still another aspect of the present invention includes a wireless communications system supporting coordinated multi-point transmission and reception (CoMP). The wireless communications system comprises a first base station, and a second base station transmitting to the first base station, a user equipment (UE) identification (ID) for a UE in a reference signal received power (RSRP) report, wherein the first base station uses the UE ID to link the RSRP report with another measurement result for the UE.

BRIEF DESCRIPTION OF THE DRAWINGS

FIG. 1 depicts a block diagram of a CoMP system.

DETAILED DESCRIPTION

Embodiment A

A1. Introduction

In the following we provide our views on channel state information (CSI) and enhanced relative narrowband Tx (transmit) power (eRNTP) exchange as well as proposals containing the required message structure.

A2. Discussion

A2.1 CSI Exchange

One eNB can send CSI report pertaining to one or more of its users to a neighboring eNB.

For each UE the CSI that the eNB sends can comprise:

CQI (channel quality indication): up-to 2 CQIs, each including a wideband CQI or component and possible sub-band differential CQIs or components RI: wideband component We note that the PMI was excluded from the CSI exchange report. The justification for this exclusion was to minimize the overhead and the fact that PMI can depend on fast changing channel information, thus reducing its utility over non ideal backhaul with a higher latency. However, in the absence of PMI the use of RI is limited. Indeed, any rank greater than 1 will convey only 2 CQIs, one for each of the two codewords. No further information about the (average) spatial directions seen by that user can be deduced by the eNB receiving the report. As a result, reporting the RI should be made optional. Moreover, the eNB requesting the CSI report should be able to able to specify whether or not it would like to receive RI reports. This can be achieved by setting a bit (for instance in the CSI Measurement Report type field) to be 0 if rank is not requested and 1 otherwise. Similarly, the eNB requesting the CSI reports should be able to specify whether or not it requires subband specific CQI reports. Another bit can be set to 0 if subband CQIs are not requested and 1 otherwise. The response of the eNB receiving the request can be mandated to comply with this request, i.e., that eNB can decide to include a rank indication in its response only if it is requested in the CSI measurement report type field of the corresponding request. Further, the subband specific CQI can be included only if they are requested in the CSI measurement report type field of the corresponding request.

In this context, we note that a CSI process can be defined to be the reference process for another one. In that case the latter process will reuse the rank determined for its reference process. It can be beneficial to exploit reference rank in the X2 signalling as well. One way to achieve this is to include another bit in the CSI Measurement Report type field which specifies whether or not a single rank is requested. In particular, this bit can be set to 1 only if the rank request bit is also set to 1. In that case the eNB receiving the request should understand that the requesting eNB is requesting CSI reports where only one rank is reported for each user. The response of the eNB receiving the request can be mandated to comply with this request, i.e., if the eNB decides to include a rank indication in its response then it has to be one indication per user.

Alternatively, no such mandate can be enforced, in which case it is up-to the eNB whether or not to include a rank indication in the CSI corresponding to each CSI-process of each user and the ranks indicated for a particular user need not be identical.

One of the goals of CSI exchange was to facilitate centralized RRM. In a scenario with centralized RRM, the central node receiving the CSI reports should be able to keep track of the CSI information received for each particular UE, over all the received CSI reports. This can be achieved by including a UE identifier in each CSI report for each UE whose CSI is conveyed in that report.

Moreover, for each CSI in the report, the CSI process configuration information should be included in order to convey the conditions under which the CSI was measured by the UE. This configuration information includes non-zero power CSI-RS information and IMR information (including, for example, the subframe indices and zero-power CSI-RS information). Since this configuration is anyway informed to the UE via higher layer signaling, for instance CSI-RS in tables 7.2.6 of TS36.213, and tables 6.10.5.2-1, 6.10.5.2-2 of TS36.211 and subframe indices in tables 7.2.6 of TS36.213, and table 6.10.5.3-1 of TS36.211, the same signaling can be reused to convey the configuration to the neighboring eNB. Another way of conveying this configuration information is through a look-up-table. A look-up-table mapping an index to each distinct applied CSI process configuration can be constructed for each eNB. Here, by an applied CSI process we mean a process that is used by at-least one served UE to measure its CSI. Such a table can be conveyed beforehand by it to eNB1, and then each report can include an index which will inform. Such a table can also be exchanged among neighbor eNBs first, and then the configuration information can be exchanged via indices.

We note that the period specified in the request by eNB1 to a neighboring eNB2 (via the Reporting Periodicity of CSI Measurement Report field) can be different from the periodicity with which the CSI is measured by a UE as per a CSI process, and then reported (over the air) to eNB2. To address such scenarios, eNB2 can either subsample (for example select the most recently received CSI) or average (over all CSIs received after those considered while determining the previous response) and send its response to eNB1, for example, about the CSI process configuration information. Note that the averaging can be done over the CQIs for a given codeword, given rank and given subband. The most recent received rank can be used for averaging.

A2.2 eRNTP Exchange

Our view on eRNTP exchange is captured in a corresponding proposal.

We note that the RNTP for the first subframe is always conveyed. If no information about the downlink (DL) power restriction on any subsequent subframe is conveyed, then the one conveyed for the first subframe can be assumed to remain static (i.e., applicable over subsequent subframes).

A3. Conclusion

We discussed the necessary X2 message to support CSI and eRNTP exchange for inter-eNB CoMP and presented corresponding proposals.

Proposals 9.1.2.1 Load Information

This message is sent by an eNB to neighbouring eNBs to transfer load and interference co-ordination information.

Direction: $eNB_1 \rightarrow eNB_2$.

TABLE A1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 ... <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 ... <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |
| >>Intended UL-DL Configuration | O | | ENUMERATED (sa0, sa1, sa2, sa3, sa4, sa5, sa6, ...) | One of the UL-DL configurations defined in TS 36.211 [10]. The UL subframe(s) in the indicated configuration is subset of those in SIB1 UL-DL configuration. This IE applies to TDD only. | YES | ignore |
| >>Extended UL Interference Overload Info | O | | 9.2.67 | This IE applies to TDD only. | YES | ignore |
| >>Enhanced Relative Narrowband Tx Power (eRNTP) | O | | 9.2.x2 | | YES | ignore |

| Range bound | Explanation |
|---|---|
| maxCellineNB | Maximum no. cells that can be served by an eNB. Value is 256. |

9.1.2.11 Resource Status Request

This message is sent by an $eNB_1$ to a neighbouring $eNB_2$ to initiate the requested measurement according to the parameters given in the message.

Direction: $eNB_1 \rightarrow eNB_2$.

TABLE A2

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ...) | Allocated by $eNB_1$ | YES | reject |
| eNB2 Measurement ID | C-ifRegistrationRequestStop | | INTEGER (1 ... 4095, ...) | Allocated by $eNB_2$ | YES | ignore |

TABLE A2-continued

| | | | | | | |
|---|---|---|---|---|---|---|
| Registration Request | M | | ENUMERATED (start, stop, . . .) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Xth Bit = UE-CSI Periodic. Other bits shall be ignored by the $eNB_2$. | YES | reject |
| Cell To Report | | 1 | | Cell ID list for which measurement is needed | YES | ignore |
| >Cell To Report Item | | 1 . . . <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, . . .) | | YES | ignore |
| Partial Success Indicator | O | | ENUMERATED (partial success allowed, . . .) | Included if partial success is allowed | YES | ignore |
| CSI Measurement Report type | O | | BITSTRING (SIZE(2)) | Each position in the bitmap indicates the type of CSI measurement to report. First bit = Rank, Second bit = subband CQI. | YES | ignore |
| Reporting Periodicity of CSI Measurement Report | O | | ENUMERATED (5 ms, 10 ms, 20 ms, 40 ms, 80 ms, aperiodic, . . .) | Periodicity for CSI Measurement Report Periodic | YES | ignore |

TABLE A2-continued

| Range bound | Explanation |
|---|---|
| maxCellineNB | Maximum no. cells that can be served by an eNB. Value is 256. |

| Condition | Explanation |
|---|---|
| ifRegistrationRequestStop | This IE shall be present if the Registration Request IE is set to the value "stop". |

9.1.2.14 Resource Status Update

This message is sent by $eNB_2$ to neighbouring $eNB_1$ to report the results of the requested measurements.

Direction: $eNB_2 \rightarrow eNB_1$.

TABLE A3

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by $eNB_1$ | YES | reject |
| eNB2 Measurement ID | M | | INTEGER (1 ... 4095, ...) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >> UE-CSI Report | O | | 9.2.x1 | | YES | ignore |

| Range bound | Explanation |
|---|---|
| maxCellineNB | Maximum no. cells that can be served by an eNB. Value is 256. |

45

9.2.x1 UE-CSI Report

This information element (IE) provides UE-CSI information for a subset or set of UEs served by $eNB_2$.

TABLE A4

| IE/Group Name | Presence | Range | IE type and reference | Semantics description |
|---|---|---|---|---|
| UE subset CSI Report | | 1 ... <maxUEsubsetCSIReport> | | |
| >C-RNTI | M | | BIT STRING (SIZE (16)) | ID of the UE served by the cell in $eNB_2$. Defined in TS 36.331. |
| >UE-CSI process information | | 1 ... <maxUE-CSIprocess> | | |
| >>Rank Indicator | O | | INTEGER (1 ... 8, ... ) or BIT STRING (SIZE (3)) | The rank indicator is present only if it is requested in the associated request. Cf. TS 36.213 [7.2.3]. |
| >>Wideband CQI For Codeword 0 | M | | INTEGER (0 ... 15, ... ) or BIT STRING (SIZE (4)) | Cf. TS 36.213 [7.2.3]. |

TABLE A4-continued

| | | | | | |
|---|---|---|---|---|---|
| >>Wideband CQI For Codeword 1 | O | | INTEGER (0 ... 15, ... ) or BIT STRING (SIZE (4)) | Cf. TS 36.213 [7.2.3]. | |
| >>Subband CQI For Codeword 0 List or Subband CQI List | | 0 ... <maxCQISubbands > | | 0 indicates no subband CQI, which is always chosen if associated request does not want subband CQI | |
| >>>Subband CQI for codeword 0 | O | | INTEGER (0 ... 15, ... ) or BIT STRING (SIZE (2)) | Cf. TS 36.213 [7.2.3]. | |
| >>>Subband CQI for codeword 1 | O | | INTEGER (0 ... 15, ... ) or BIT STRING (SIZE (2)) | Cf. TS 36.213 [7.2.3]. | |
| >>UE-CSI process Configuration information | M | | INTEGER (0 ... 31) or FFS | CSI process configuration information. | |

| Range bound | Explanation |
|---|---|
| maxUEsubsetCSIReport | Maximum UE subset size for which UE-CSI can be reported. The value is 32. |
| maxUE-CSIProcess | Maximum number of CSI processes per-UE. The value is 4. |
| maxCQISubbands | Maximum number of subbands for UE CQI reporting. The value is 28. | maxUEsubsetCSIReport can alternatively be set to 16, 20, 30, 35, or 40.

9.2.x2 Enhanced Relative Narrowband Tx Power (E-RNTP)

This IE (information element) provides an indication on DL power restriction per PRB (physical resource block) per subframe in a cell and other information needed by to a neighbour eNB for interference aware scheduling.

TABLE A5

| IE/Group Name | Presence | Range | IE type and reference | Semantics description | Criticality | Assigned Criticality |
|---|---|---|---|---|---|---|
| RNTP Per PRB | M | | BIT STRING (6 ... 110, ... ) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the first subframe. In case the DL | — | — |

TABLE A5-continued

| | | | | |
|---|---|---|---|---|
| | | | | power restriction is static, the indicated DL power restriction is maintained over the subsequent subframes. |
| RNTP Threshold | M | | ENUMERATED (−∞, −11, −10, −9, −8, −7, −6, −5, −4, −3, −2, −1, 0, 1, 2, 3, . . .) | $RNTP_{threshold}$ is defined in TS 36.213 [11]. |
| Number Of Cell-specific Antenna Ports | M | | ENUMERATED (1, 2, 4, . . .) | P (number of antenna ports for cell-specific reference signals) defined in TS 36.211 [10] |
| P_B | M | | INTEGER (0 . . . 3, . . .) | $P_B$ is defined in TS 36.213 [11]. |
| PDCCH Interference Impact | M | | INTEGER (0 . . . 4, . . .) | Measured by Predicted Number Of Occupied PDCCH OFDM Symbols (see TS 36.211 [10]). Value 0 means "no prediction is available". |
| Starting SFN | M | | INTEGER (0 . . . 1023, . . .) | Number of the first system frame from which the RNTP Per PRB Per Subframe IE is valid. |
| Starting Subframe Index | M | | INTEGER (0 . . . 9, . . .) | Index of the first subframe from which the RNTP Per PRB Per Subframe IE is valid. |
| RNTP List | O | 2 . . . <maxnoofSubframes> | | The first item in the list corresponds to the second subframe, the second to the third subframe, and so on. The DL power restrictions conveyed for the first subframe and the ones conveyed for the subsequent subframes in the list, are together applied repeatedly. |

TABLE A5-continued

| | | | |
|---|---|---|---|
| >RNTP Per PRB Subframe-Specific | M | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the corresponding subframe. |

| Range bound | Explanation |
|---|---|
| maxSubframe | Maximum number of subframes. Value is 40. |

Embodiment B

B1. Introduction

In the following we provide our views on CSI and eRNTP exchange, as well as proposals containing the required message structures.

B2. Discussion

B2.1 CSI Exchange: Configuring CSI Processes

The concept of CSI processes was defined in Rel.11 to enable CSI feedback from a UE to its serving eNB. The CSI feedback is determined for each CSI process according to the serving TP and interference hypothesis configured in that process. Each CSI process that is configured for a UE, comprises a set of resource elements on which non-zero power CSI-RSs are sent and a channel estimate is obtained by that UE using observations received on those resource elements.

In addition, a set of resource elements is also indicated by the CSI process (referred to as interference measurement resources (IMRs)) on which the UE estimates the covariance of the interference it observes. The channel and covariance estimates are together used by the UE to determine and send its feedback report corresponding to that CSI process. Multiple such CSI processes (up-to 4) can be configured for a UE, each process corresponding to a different choice of signal or interference hypothesis. Moreover, in the scenario in which fast switching of the serving TP is not possible, different CSI processes that are configured for any given UE typically correspond to different choices of interference hypothesis.

Note from the brief discussion above that in the event the interference hypothesis of a configured CSI process presumes muting from a TP (that is a dominant interferer for the UE of interest) which is controlled by the neighboring eNB, coordination among the eNBs is required in order to ensure that the interference estimated by the UE on the constituent IMRs is consistent with the assumed hypothesis. Another similar event that requires coordination is if the non-zero power CSI-RSs indicated in the CSI process must be interference protected in order to ensure reliable channel estimation at the UE. In both these events, the dominant interferer that is controlled by the neighboring eNB must be muted on certain resource elements. Thus, a mechanism (with appropriate signaling) should be available to share the CSI-RS (comprising non-zero power CSI-RSs and IMRs) configurations between eNBs, which would facilitate configuration of CSI processes across multiple eNBs.

Once the CSI processes are configured, the CSI exchanged among eNBs over the backhaul should include the respective CSI process configuration information, in order to convey the conditions under which the CSI was measured by the UE. This configuration information includes non-zero power CSI-RS information and IMR information (comprising the subframe indices and zero-power CSI-RS information). Since this configuration is anyway informed to the UE via RRC (or higher layer) signaling, the same information can be reused as a container to convey the configuration to the neighboring eNB.

Another way of conveying this configuration information is through a look-up-table. A look-up-table mapping an index to one or more distinct applied CSI process configurations can be constructed for each eNB. Here, by an applied CSI process we mean a process that is used by at-least one UE served by that eNB to measure its CSI. Such a table can be exchanged among neighbors first and from then on the configuration information can be exchanged via indices. The total number of configurations in the table can be limited in order to limit signaling overhead.

Suitable values for the number of configurations in this table are either 8 or 16 or 32.

B2.2 CSI Exchange: Contents

One eNB can send CSI report pertaining to one or more of UEs to a neighboring eNB. For each UE, the CSI that the eNB sends to a neighbor can comprise:

(i) CQI: up-to 2 CQIs, each including a wideband component and possible sub-band differential components (ii) RI (rank indicator): one wideband component We note that the PMI was excluded from the CSI exchange report [1]. The justification for this exclusion was to minimize the overhead and the fact that PMI can depend on fast changing channel information, thus reducing its utility over non ideal backhaul with a higher latency. However, in the absence of PMI the use of RI is limited. Indeed, any rank greater than 1 will convey only 2 CQI(s), one for each of the two codewords. No further information about the (average) spatial directions seen by that UE can be deduced by the eNB receiving the report. As a result, reporting the RI should be made optional. Moreover, the eNB requesting the CSI report should be able to specify whether or not it would like to receive RI reports. Similarly, the eNB requesting the CSI reports should be able to specify whether or not it requires subband specific CQI reports. This can be achieved by setting a bit (in the measurement request) to be 0 if rank is not requested and 1 otherwise. Another bit can be set to 0 if subband CQIs are not requested and 1 otherwise.

Processing (filtering or subsampling) of the short-term CSI (received via over-the-air signaling) at an eNB prior to exchange should be permitted.

One use case for this is when the periodicity of the CSI report that is requested by eNB1 to its neighbor eNB2, is larger than the over-the-air CSI signaling periodicity configured by eNB2. In this case eNB2 has to do some processing (such as subsampling or averaging) of the reports it receives before it sends it to eNB1. In this context, we note that the subsampling employed by eNB2 should be understood by eNB1 (if needed additional signaling can be added to ensure this). One possible way this can be accomplished (without any signaling overhead) is for eNB2 to use the subsampling factor determined by a pre-determined rule (known to or configured for all eNBs in advance) that outputs a subsampling factor, given the requested periodicity and CSI process configuration as inputs. On the other hand, averaging or scaling or filtering employed by eNB2 can be transparent to the receiving eNB1.

One of the goals of CSI exchange is to facilitate centralized RRM [3]. In a scenario with centralized RRM, the central node receiving the CSI reports should be able to keep track of the CSI information received for each particular UE, over all the received CSI reports. This can be achieved by including a UE identifier in each CSI report for each UE whose CSI is conveyed in that report. We want to include a unique ID (identification or identifier) for each user so that the receiving node knows which ones among all the reports that it receives, belong that user. This will be useful for RRM. Otherwise the receiving eNB will regard each received report as belonging to a distinct user. This can lead to sub-optimal resource allocation.

B2.3 eRNTP Exchange

Our view on eRNTP exchange is captured in a corresponding proposal attached in the end of this embodiment.

We note that the RNTP (i.e., downlink (DL) power restriction) for the first subframe is always conveyed. If no information about the DL power restriction on any subsequent subframe is conveyed, then the one conveyed for the first subframe can be assumed to remain static (i.e., applicable over subsequent subframes).

We also present several variations, one of which includes the use of multiple thresholds B3. Conclusion We discussed the necessary X2 message to support CSI and eRNTP exchange for inter-eNB CoMP and presented corresponding proposals.

Proposals 9.1.2.11 Resource Status Request

This message is sent by an $eNB_1$ to a neighbouring $eNB_2$ to initiate the requested measurement according to the parameters given in the message.

Direction: $eNB_1 \rightarrow eNB_2$.

TABLE B1

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ... ) | Allocated by $eNB_1$ | YES | reject |
| eNB2 Measurement ID | C-ifRegistrationRequestStop | | INTEGER (1 ... 4095, ... ) | Allocated by $eNB_2$ | YES | ignore |
| Registration Request | M | | ENUMERATED (start, stop, ... ) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB | YES | reject |

TABLE B1-continued

| | | | | | | |
|---|---|---|---|---|---|---|
| | | | | Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Xth Bit = UE-CSI Periodic. Other bits shall be ignored by the eNB$_2$. | | |
| Cell To Report | | 1 | | Cell ID list for which measurement is needed | YES | ignore |
| >Cell To Report Item | | 1 . . . <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, . . . ) | | YES | ignore |
| Partial Success Indicator | O | | ENUMERATED (partial success allowed, . . . ) | Included if partial success is allowed | YES | ignore |
| CSI Measurement Report type | O | | BITSTRING (SIZE(2)) | Each position in the bitmap indicates the type of CSI measurement to report. First bit = Rank, Second bit = subband CQI. | YES | ignore |
| ((Reporting Periodicity of CSI Measurement Report | O | | ENUMERATED (5 ms, 10 ms, 20 ms, 40 ms, 80 ms, aperiodic, . . . ) | Periodicity for CSI Measurement Report Periodic | YES | ignore |

TABLE B1-continued

| | Explanation |
|---|---|
| Range bound | |
| maxCellineNB | Maximum no. cells that can be served by an eNB. Value is 256. |
| Condition | |
| ifRegistrationRequestStop | This IE shall be present if the Registration Request IE is set to the value "stop". |

9.1.2.14 Resource Status Update
This message is sent by eNB2 to neighbouring eNB1 to report the results of the requested measurements.
Direction: $eNB_2 \rightarrow eNB_1$.

TABLE B2

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | Allocated by $eNB_1$ | YES | reject |
| eNB2 Measurement ID | M | | INTEGER (1 ... 4095, ... ) | Allocated by $eNB_2$ | YES | reject |
| Cell Measurement Result | | 1 | | | YES | ignore |
| >Cell Measurement Result Item | | 1 ... <maxCelline NB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >> UE-CSI Report | O | | 9.2.x1 | | YES | ignore |

| Range bound | Explanation |
|---|---|
| maxCellineNB | Maximum no. cells that can be served by an eNB. Value is 256. |

9.2.x1 UE-CSI Report
This IE provides UE-CSI information for a set of UEs served by $eNB_2$.

TABLE B3

| IE/Group Name | Presence | Range | IE type and reference | Semantics description |
|---|---|---|---|---|
| UE subset CSI Report | | 1 ... <maxUEsubsetCSIReport > | | |
| >(C-RNTI) UE ID | M | | BIT STRING (SIZE (16)) | ID of the UE served by the cell in $eNB_2$. Defined in TS 36.331. |
| >UE-CSI process information | | 1 ... <maxUE-CSI process> | | |

TABLE B3-continued

| | Presence | Range | IE type and reference | Semantics description |
|---|---|---|---|---|
| >>Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | Cf. TS 36.213 [7.2.3]. |
| >>Wideband CQI For Codeword 1 | O | | BIT STRING (SIZE (4)) | Cf. TS 36.213 [7.2.3]. |
| >>Subband CQI List | | 0 . . . <maxCQI Subbands> | | 0 indicates no subband CQI, which is always chosen if associated request does not want subband CQI, or this IE is present only if associated request wants subband CQI |
| >>>Subband CQI for codeword 0 | O | | BIT STRING (SIZE (2)) | Cf. TS 36.213 [7.2.3]. |
| >>>Subband CQI for codeword 1 | O | | BIT STRING (SIZE (2)) | Cf. TS 36.213 [7.2.3]. |
| >>UE-CSI process Configuration information | M | | FFS | CSI process configuration information. |

| Range bound | Explanation |
|---|---|
| maxUEsubsetCSIReport | Maximum UE subset size for which UE-CSI can be reported. The value is 32. |
| maxUE-CSIProcess | Maximum number of CSI processes per-UE. The value is 4. |
| maxCQISubbands | Maximum number of subbands for UE CQI reporting. The value is 28. |

Alternatively, the parameter maxUEsubsetCSIReport can be 8, 16, 32, 48, 64, or 256. Further, optionally, the UE-ID can have a more compact representation using say 8 bits or 6 bits or 5 bits (equivalently 256 or 64 or 32 possible indices from a configurable table).

Next, we consider the case when subband indices have to be indicated. This is important to accommodate feedback modes that involve UE selected subband feedback.

TABLE B4

| IE/Group Name | Presence | Range | IE type and reference | Semantics description |
|---|---|---|---|---|
| UE subset CSI Report | | 1 . . . <maxUEsubset CSIReport> | | |
| >C-RNTI | M | | BIT STRING (SIZE (16)) | ID of the UE served by the cell in eNB$_2$. Defined in TS 36.331. |
| >UE-CSI process information | | 1 . . . <maxUE-CSIprocess> | | |
| >>Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | |
| >>Wideband CQI For Codeword 1 | O | | BIT STRING (SIZE (4)) | |
| >>Subband CQI List | | 0 . . . <maxCQISub- bands> | | This IE is present only if associated request wants subband CQI |

TABLE B4-continued

| | | | |
|---|---|---|---|
| >>>Subband CQI for codeword 0 | O | BIT STRING (SIZE (4)) | |
| >>>Subband CQI for codeword 1 | O | BIT STRING (SIZE (4)) | |
| >>>Subband index | O | INTEGER (0 . . . 27, . . . ) | Included in case of UE selected subband CQI reporting. |
| >>UE-CSI process Configuration information | M | FFS | CSI process configuration information. |

Note that as an alternative in the above tables, for each CQI the bit string field of 4 bits (2 bits) can be replaced by INTEGER (0 . . . 15, . . . ) (INTEGER (0 . . . 7, . . . )).

In another alternative the sub band indices can be conveyed by means of a combinatorial index which is described next.

The idea here is that depending on the number of PRBs (or RBs (resource blocks) for short) in the downlink available at sending eNB2 (a parameter which is known or conveyed separately to the receiving eNB1), the set of all possible subband selections that can be made together with the subband size, for all feedback modes, can be deduced by eNB1.

For example when 110 RBs are available at eNB2 (and this number is conveyed to eNB1) eNB1 can deduce that for a UE configured under:

Aperiodic, Mode 2-*: 6 UE selected subband indices

A subframe is composed of 28 subbands. Among 28 subbands, 6 subbands are selected by the UE. The number of PRBs in the subbands is 4 except for the last one; the number of PRBs in the last subband is 2 (4*27+2=110).

For Aperiodic, Mode 3-*: 14 higher layer-configured sub bands

A subframe is composed of 14 subbands. The number of PRBs in the subband is 8 except for the last one; the number of PRBs in the last subband is 6 (8*13+6=110).

For Periodic, Mode 2-*: 4 UE selected subband indices (with an additional constraint on choosing one sub band per bandwidth portion or part)

A subframe is composed of 14 subbands. Among 14 subbands, 4 subbands are selected by the UE. The number of PRBs in the subbands is 8 except for the last one; the number of PRBs in the last subband is 6 (8*13+6=110).

Then, considering all possible feasible subband selections under all the aforementioned feedback modes, it is possible to assign a unique label to each distinct feasible selection of sub bands. All possible such labels together decide the range of a combinatorial index R. As a result, knowing the value of R the receiving eNB1 can deduce the subband selection. The associated CQIs (one for each subband in the indicated selection) can be ordered in the increasing order of the frequency range represented by the indicated subbands. Each such CQI can be conveyed using full representation (i.e., using 16 possibilities) which can then be directly used by the receiving eNB1.

TABLE B5

| IE/Group Name | Presence | Range | IE type and reference | Semantics description |
|---|---|---|---|---|
| UE subset CSI Report | | 1 . . . <maxUEsubsetCSIReport> | | |
| >C-RNTI | M | | BIT STRING (SIZE (16)) | ID of the UE served by the cell in eNB$_2$. Defined in TS 36.331. |
| >UE-CSI process information | | 1 . . . <maxUE-CSIprocess> | | |
| >>Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | |
| >>Wideband CQI For Codeword 1 | O | | BIT STRING (SIZE (4)) | |
| >>combinatorial index | O | | Integer FFS | This IE is present only if associated request wants subband CQI |
| >>>Subband CQI List | | 0 . . . <maxCQISubbands > | | The number of subbands in the list as well as their respective indices and sizes are deduced from the combinatorial index. |

TABLE B5-continued

| IE/Group Name | Presence | Range | IE type and reference | Semantics description |
|---|---|---|---|---|
| >>>>Subband CQI for codeword 0 | M | | BIT STRING (SIZE (4)) | |
| >>>>Subband CQI for codeword 1 | O | | BIT STRING (SIZE (4)) | |
| >>UE-CSI process Configuration information | M | | FFS | CSI process configuration information. |

UE Configuration Independent Coding Structure

A coding structure for signaling CSI over X2 in a UE-configuration independent way is shown in Table I1. In this structure, a subband is defined as a set of contiguous PRBs having the same CQI value. The subband partitioning is left to the sending eNB2 implementation, and is not restricted by the UE's CSI reporting configuration. Each indicated CQI follows the definition of a 4 bit CQI (Cf. TS 36.213). This allows for the sending eNB2 to process the CSI it receives from the UE in any manner as long as each indicated CQI is consistent with the basic CQI definition. The receiving eNB1 can directly use these CQIs while being agnostic to how they were procured and processed by eNB1.

TABLE B6

UE configuration independent coding structure

| IE/Group Name | Presence | Range | IE type and reference | Semantics description |
|---|---|---|---|---|
| CSI per UE | | 1 ... <maxnoofUE-CSI> | | |
| >C-RNTI | M | | BIT STRING (SIZE (16)) | |
| >CSI per Interference Hypotheses | | 1 ... <maxnoofInterferenceHypothesis > | | |
| >>Interference Hypothesis Information | M | | [FFS] | |
| >>Wideband CQI for Codeword 0 | M | | INTEGER (0 ... 15, ... ) | |
| >>Wideband CQI for Codeword 1 | O | | INTEGER (0 ... 15, ... ) | |
| >>Rank Indication | M | | INTEGER (1 ... 8, ... ) | Defined in TS 36.213 [11]. |
| >>Subband CQI List | | 0 ... <maxnoofSubband> | | Subbands are listed in the order of increasing frequency. |
| >>>Subband Start | O | | INTEGER (0 ... 109, ... ) | PRB number of the first PRB in the subband. If this IE is not present, the subband is contiguous with the previous subband in the list, or starts with PRB 0 if this is the first subband in the list. |
| >>>Subband Size | O | | INTEGER (1 ... 110, ... ) | Number of contiguous PRBs in the subband. If this IE is not present, the value is the same as the previous subband in the list. |
| >>>Subband CQI for Codeword 0 | M | | INTEGER (0 ... 15, ... ) | |
| >>>Subband CQI for Codeword 1 | O | | INTEGER (0 ... 15, ... ) | |

| Range bound | Explanation |
|---|---|
| maxnoofUE-CSI | Maximum number of UE-specific CSI reports. Value is 128 or 64 or 32 |
| maxnoofInterferenceHypotheses | Maximum number of Interference Hypotheses. Value is 4. |
| maxnoofSubband | Maximum number of Subbands. Value is 28. |

We note here that reporting full (complete) CQI (with 16 possibilities) for each indicated subband CQI instead of differential CQI is useful since otherwise the receiving eNB1 may not know how to combine a corresponding wideband CQI and differential sub-band CQI (with fewer than 16 possibilities) in order to obtain the full CQI for that subband, for instance, in the case that the precise feedback mode configured for the UE of interest under that CSI process is not conveyed to the receiving eNB1. We note here also that it might be desirable to not impose restrictions on sending eNB2 on how it combines reports from multiple different feedback modes configured for that UE under the same CSI process. Then, note that when aperiodic feedback mode 3-1 is configured for the UE (by eNB2), the UE reported sub band CQI is encoded differentially with respect to the corresponding wideband CQI using 2 bits representing differential values {−2, 0, 1, 2}. On the other hand, in the case of aperiodic feedback mode 2-0 or 2-2, only the best M-average is reported by the UE by differentially encoding it with respect to a corresponding wideband CQI using 2 bits representing differential values {1, 2, 3, 4}. Further, in case of periodic feedback mode 2-1 the CQI corresponding to codeword-1 for each UE selected subband within a bandwidth part can itself be of 4 bits, whereas that of codeword-2 (when RI>1) is differentially encoded with respect to CQI of codeword-1 using 3 bits.

It becomes apparent from the above discussion that a transparent way of conveying CQI (without having to convey all details regarding to one or more feedback modes configured under that CSI process for that UE) is to allow for full (complete) CQI for each indicated subband.

Another issue that is important, is to ensure that the RI and CQIs conveyed by eNB2 to eNB1 in a UE CSI report are mutually consistent, i.e., all the reported CQIs are computed by the UE for the same RI (which is identical to the one in the Rank Indication IE when the latter is present). This issue is important to address because under certain feedback modes (such as periodic mode 2-1) the RI and the wideband CQI(s) as well as the subband CQI(s) for one or more bandwidth portions can be reported by the UE on different subframes. Thus, depending on the periodicity defined by eNB1 in its CSI request, it can happen that the latest RI available for the UE under the CSI process, can be different from the one for which the most recent CQI(s) are computed. In such a case, the sending eNB2 should ensure that its CSI report is consistent, for instance by using the RI value for which the most recently available CQI(s) have been computed.

The variation (which allows the requesting eNB to specify whether or not it wants to receive subband CQI(s) or Rank Indication is provided below. In this context, we note that since the requesting eNB1 has no control over how eNB2 configures CSI processes (and constituent feedback modes) for its users, it should be in any case able to exploit different type of CSI reports (wideband only or wideband and subband).

TABLE B7

| IE/Group Name | Presence | Range | IE type and reference | Semantics description |
| --- | --- | --- | --- | --- |
| CSI per UE | | 1 ... <maxnoofUE-CSI> | | |
| >C-RNTI | M | | BIT STRING (SIZE (16)) | |
| >CSI per Interference Hypotheses | | 1 ... <maxnoofInterference-Hypothesis > | | |
| >>Interference Hypothesis Information | M | | [FFS] | |
| >>Wideband CQI for Codeword 0 | M | | INTEGER (0 ... 15, ... ) | |
| >>Wideband CQI for Codeword 1 | O | | INTEGER (0 ... 15, ... ) | |
| >>Rank Indication | O | | INTEGER (1 ... 8, ... ) | The rank indication IE is present only if it is requested in the associated request. In that case it follows the definition in TS 36.213 [11]. |
| >>Subband CQI List | | 0 ... <maxnoofSubband> | | This IE is present only if associated request wants subband CQI. In that case subbands are listed in the order of increasing frequency. |
| >>>Subband Start | O | | INTEGER (0 ... 109, ... ) | PRB number of the first PRB in the subband. If this IE is not present, the subband is contiguous with the previous subband in the list, or starts with PRB 0 if this is the first subband in the list. |
| >>>Subband Size | O | | INTEGER (1 ... 110, ... ) | Number of contiguous PRBs in the subband. If this IE is not present, the value is the same as the previous subband in the list. |
| >>>Subband CQI for Codeword 0 | M | | INTEGER (0 ... 15, ... ) | |
| >>>Subband CQI for Codeword 1 | O | | INTEGER (0 ... 15, ... ) | |

Another variation which allows for further simplification at the expense of not being bit efficient is as follows. Here the full CQIs for all possible subbands (which can be determined by the number of PRBs in the downlink available at eNB2) are always conveyed for a UE under the CSI process. In case the sub band CQI is not reported by a UE under the configured feedback mode for a subband, the sending eNB2 simply uses the corresponding wideband CQI value for that subband. Then, note that there is no need to include the wideband CQI(s) in case the associated request wants subband CQI.

9.2.19 Relative Narrowband Tx Power (RNTP)

This IE provides an indication on DL power restriction per PRB in a cell and other information needed by a neighbour eNB for interference aware scheduling.

TABLE B8

| IE/Group Name | Presence | Range | IE type and reference | Semantics description | Criticality | Assigned Criticality |
|---|---|---|---|---|---|---|
| RNTP Per PRB | M | | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the first subframe. In case the DL power restriction is static, the indicated DL power restriction is maintained over the subsequent subframes. | — | — |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in TS 36.213 [11]. | — | — |
| Number Of Cell-specific Antenna Ports | M | | ENUMERATED (1, 2, 4, ...) | P (number of antenna ports for cell-specific reference signals) defined in TS 36.211 [10] | — | — |
| P_B | M | | INTEGER (0 ... 3, ...) | $P_B$ is defined in TS 36.213 [11]. | — | — |
| PDCCH Interference Impact | M | | INTEGER (0 ... 4, ...) | Measured by Predicted Number Of Occupied PDCCH OFDM Symbols (see TS 36.211 [10]). Value 0 means "no prediction is available". | — | — |
| Extended RNTP Per PRB | M or O | | BIT STRING (6 ... 4290, ...) | Each position in the bitmap represents a PRB in a subframe, for which value "1" indicates 'interference protected resource' or 'no promise on the Tx power is given' and value "0" | | |

TABLE B8-continued

| IE/Group Name | Presence | Range | IE type and reference | Semantics description | Criticality | Assigned Criticality |
|---|---|---|---|---|---|---|
| | | | | indicates 'resource with no utilization constraints' or 'Tx not exceeding RNTP threshold.' The first bit corresponds to PRB 0 of the second or first subframe for which the extended RNTP per PRB IE is valid, the second bit corresponds to PRB 1 of the second or first subframe for which the extended RNTP per PRB IE is valid, and so on. The length of the bit string is an integer (maximum 39) multiple of $N_{RB}^{DL}$. $N_{RB}^{DL}$ is defined in TS 36.211 [10]. The bit string may span across multiple contiguous subframes. The pattern across contiguous subframes (formed by RNTP per PRB and extended RNTP per PRB) is continuously repeated. | | |
| RNTP per PRB start time | | 0 ... 1 | | | | |
| >Starting SFN | M or O | | INTEGER (0 ... 1023, ...) | Number of the first system frame from which the RNTP Per PRB (Per Subframe) IE is valid or SFN of the radio frame containing the first subframe when the RNTP Per PRB IE is valid. | | |
| >Starting Subframe Index | M or O | | INTEGER (0 ... 9, ...) | Index of the first subframe from which the RNTP Per PRB (Per Subframe) IE is valid or Subframe number, within the radio frame indicated by the Start SFN IE, of the first subframe when the RNTP Per PRB IE is valid. | | |

An alternate Table for RNTP enhancement is given below.

TABLE B9

| IE/Group Name | Presence | Range | IE type and reference | Semantics description | Criticality | Assigned Criticality |
|---|---|---|---|---|---|---|
| RNTP per PRB | M | | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is ignored if the RNTP per PRB per subframe IE is present. | — | — |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in TS 36.213 [11]. | — | — |
| Number Of Cell-specific Antenna Ports | M | | ENUMERATED (1, 2, 4, ...) | P (number of antenna ports for cell-specific reference signals) defined in TS 36.211 [10] | — | — |
| P_B | M | | INTEGER (0 ... 3, ...) | $P_B$ is defined in TS 36.213 [11]. | — | — |
| PDCCH Interference Impact | M | | INTEGER (0 ... 4, ...) | Measured by Predicted Number Of Occupied PDCCH OFDM Symbols (see TS 36.211 [10]). Value 0 means "no prediction is available". | — | — |
| RNTP Per PRB per subframe | O | | BIT STRING (6 ... 4400, ...) | Each position in the bitmap represents a PRB in a subframe, for which value "1" indicates 'no promise on the Tx power is given' and value "0" indicates 'Tx not exceeding RNTP threshold.' The first bit corresponds to PRB 0 of the first subframe for which the RNTP per PRB per subframe IE is valid, the second bit corresponds to PRB 1 of the first subframe for which the RNTP per PRB per subframe IE is valid, and so on. The length of the bit string is an | | |

TABLE B9-continued

| IE/Group Name | Presence | Range | IE type and reference | Semantics description | Criticality | Assigned Criticality |
|---|---|---|---|---|---|---|
| | | | | integer (maximum 40) multiple of $N_{RB}^{DL}$. $N_{RB}^{DL}$ is defined in TS 36.211 [10]. The bit string may span across multiple contiguous subframes. The pattern across contiguous subframes formed by RNTP per PRB per subframe IE is continuously repeated. | | |
| RNTP per PRB per subframe start time | | 0 . . . 1 | | | | |
| >Starting SFN | M | | INTEGER (0 . . . 1023, . . .) | SFN of the radio frame containing the first subframe when the RNTP Per PRB Per Subframe IE is valid. | | |
| >Starting Subframe Index | M | | INTEGER (0 . . . 9, . . .) | Subframe number, within the radio frame indicated by the Start SFN IE, of the first subframe when the RNTP Per PRB Per Subframe IE is valid. | | |

Another alternate Table for RNTP enhancement is given below.

TABLE B10

| IE/Group Name | Presence | Range | IE type and reference | Semantics description | Criticality | Assigned Criticality |
|---|---|---|---|---|---|---|
| RNTP per PRB | M | | BIT STRING (6 . . . 110, . . .) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is ignored if the RNTP per PRB per subframe IE is present. | — | — |
| RNTP Threshold | M | | ENUMERATED (−∞, −11, −10, −9, −8, −7, −6, −5, −4, −3, −2, −1, 0, 1, 2, 3, . . .) | $RNTP_{threshold}$ is defined in TS 36.213 [11]. | — | — |

TABLE B10-continued

| IE/Group Name | Presence | Range | IE type and reference | Semantics description | Criticality | Assigned Criticality |
|---|---|---|---|---|---|---|
| Number Of Cell-specific Antenna Ports | M | | ENUMERATED (1, 2, 4, . . .) | P (number of antenna ports for cell-specific reference signals) defined in TS 36.211 [10] | — | — |
| P_B | M | | INTEGER (0 . . . 3, . . .) | $P_B$ is defined in TS 36.213 [11]. | — | — |
| PDCCH Interference Impact | M | | INTEGER (0 . . . 4, . . .) | Measured by Predicted Number Of Occupied PDCCH OFDM Symbols (see TS 36.211 [10]). Value 0 means "no prediction is available". | — | — |
| RNTP Per PRB per subframe | O | | BIT STRING (6 . . . 4400, . . .) | Each position in the bitmap represents a PRB in a subframe, for which value "1" indicates 'resource with no utilization constraints' and value "0" indicates 'interference protected resource.' The first bit corresponds to PRB 0 of the first subframe for which the RNTP per PRB per subframe IE is valid, the second bit corresponds to PRB 1 of the first subframe for which the RNTP per PRB per subframe IE is valid, and so on. The length of the bit string is an integer (maximum 40) multiple of $N_{RB}^{DL}$. $N_{RB}^{DL}$ is defined in TS 36.211 [10]. The bit string may span across multiple contiguous subframes. The pattern across contiguous subframes formed by RNTP per PRB per subframe IE is continuously repeated. | | |
| RNTP per PRB per subframe start time | | 0 . . . 1 | | | | |
| >Starting SFN | M | | INTEGER (0 . . . 1023, . . .) | SFN of the radio frame containing the first subframe when the RNTP Per PRB Per Subframe IE is valid. | | |
| >Starting Subframe Index | M | | INTEGER (0 . . . 9, . . .) | Subframe number, within the radio frame indicated by the Start SFN IE, of |

TABLE B10-continued

| IE/Group Name | Presence | Range | IE type and reference | Semantics description | Criticality | Assigned Criticality |
|---|---|---|---|---|---|---|
| | | | | the first subframe when the RNTP Per PRB Per Subframe IE is valid. | | |

Another alternative using multiple thresholds conveyed via 2 bits is given below.

TABLE B11

| IE/Group Name | Presence | Range | IE type and reference | Semantics description | Criticality | Assigned Criticality |
|---|---|---|---|---|---|---|
| ERNTP Per PRB and subframe | M | | BIT STRING (12 . . . 220, . . .) | Each position in the bitmap represents a PRB in a subframe, for which the value "xx" indicates how the transmission power in a resource block is mapped relative to the two power thresholds:<br>00 - power level not exceeding the LPTH<br>01 - power level between LPTH and MPTH;<br>10 - power level between MPTH and HPTH;<br>11 - no promise on the Tx power is given.<br>The first 2 bits correspond to PRB 0 of the first subframe for which the IE is valid, the following 2 bits correspond to PRB 1 of the first subframe for which the IE is valid, and so on. The bit string may span across multiple contiguous subframes. The length of the bit string is an integer (maximum 40) multiple of $N_{RB}^{DL}$. The parameter is defined in TS 36.211 [10]. The ERNTP pattern is continuously repeated with a periodicity indicated in Periodicity. | — | — |

TABLE B11-continued

| IE/Group Name | Presence | Range | IE type and reference | Semantics description | Criticality | Assigned Criticality |
|---|---|---|---|---|---|---|
| Transmitted power levels | | | | | | |
| LPTH (Low Power Threshold) | M | | ENUMERATED (−∞, −11, −10, −9, −8, −7, −6, −5, −4, −3, −2, −1, 0, 1, 2, 3, . . .) | Lower RNTP power threshold, using the $RNTP_{threshold}$ defined in TS 36.213 [11]. | — | — |
| MPTH (Medium Power Threshold) | M | | ENUMERATED (−∞, −11, −10, −9, −8, −7, −6, −5, −4, −3, −2, −1, 0, 1, 2, 3, . . .) | Medium RNTP power threshold, using the $RNTP_{threshold}$ defined in TS 36.213 [11]. | | |
| HPTH (High Power Threshold) | M | | ENUMERATED (−∞ −11, −10, −9, −8, −7, −6, −5, −4, −3, −2, −1, 0, 1, 2, 3, . . .) | Higher RNTP power threshold, using the $RNTP_{threshold}$ defined in TS 36.213 [11]. | | |
| Subframe sequence definition | | | | | | |
| >Start SFN | M | | INTEGER (0 . . . 1023) | SFN of the radio frame containing the first subframe where the RNTP Per PRB Per Subframe IE is valid. | | |
| >Start Subframe Number | M | | INTEGER (0 . . . 39) | Subframe number, within the radio frame indicated by the Start SFN IE, of the first subframe when the RNTP Per PRB Per Subframe IE is valid. | | |
| No. of subframes | M | | 1 . . . 40 | No. of subframes for which is defined the bitstream | | |
| Periodicity | | | 1 . . . 40 | The number of subframes after which the bit pattern is repeated | | |
| Number Of Cell-specific Antenna Ports | M | | ENUMERATED (1, 2, 4, . . .) | P (number of antenna ports for cell-specific reference signals) defined in TS 36.211 [10] | | |
| P_B | M | | INTEGER (0 . . . 3, . . .) | $P_B$ is defined in TS 36.213 [11]. | | |

The point in the table given above is that since the choice '11' already indicates no promise on the power level (which covers the case of transmit power being arbitrarily high) we can use three thresholds (instead of two) since there is no need to convey that the power level is greater than HPTH (as this is subsumed by '11').

However, one problem with indicating multiple thresholds is that the current CoMP hypothesis (implicitly) assumes just one threshold. In this sense there is a mismatch between using multiple thresholds in eRNTP and not in the CoMP hypothesis. Consequently, the full potential of multiple thresholds may not be realized inspire of the additional overhead.

Embodiment C

C1. Introduction

In the following we provide our views on CSI exchange, as well as proposals containing the required message structures.

C2. Discussion

C2.1 CSI Exchange: Configuring CSI Processes

From previous discussion it is evident that coordination among the eNBs is required in order to define a set of assignable CSI processes that have a consistent meaning. Once the set of these CSI processes is defined, the CSI exchanged among eNBs should include the respective CSI process configuration information, in order to convey the conditions under which the CSI was measured by the UE. This configuration information should include CSI-RS-ConfigNZP [36.331b, Section 6.3.2] and CSI-IM-Config [36.331b, Section 6.3.2]. We note here that doing so would enable exchange of per-point CSI process (under which the UE estimates RS from any one point in its measurement set (or CoMP set) while the associated IMR measures the out of CoMP set or out of cluster interference) configuration. If one such process is sent to a receiving eNB for each point in that UE's measurement set, any interference hypothesis for that UE can be emulated by receiving eNB. This can indeed mitigate the bottleneck in terms defining enough CSI processes to cover sufficiently many interference hypotheses. One way of conveying this configuration information is through a look-up-table. A look-up-table mapping an index to each possible distinct CSI process configuration can be constructed (possibly separately for each eNB). Here, by a possible CSI process we mean a process that can be assigned to a served UE to measure its CSI. Such a table can be exchanged among neighbors first and from then on the configuration information can be exchanged via indices. The total number of defined processes (including their configuration information) in each table can be limited in order to limit signaling overhead. For instance, this number could be one of {7, 8, 9, 16, 32}. As an option, the configuration information for a process can also include power offset value Pc and/or offsets Pa and Pb, that were configured for that process. Further optionally, it can also indicate for which (if any) among the other processes, that process was set to be reference rank process. As an additional option, the configured feedback mode information (such as periodic or aperiodic) can also be included.

C2.2 CSI Exchange: Contents

One eNB can send CSI reports pertaining to one or more of its UEs to a neighboring eNB. For each UE, the CSI that the eNB sends to a neighbor can comprise:

CQI: up-to 2 CQIs, each including a wideband component and possible sub-band components RI: one wideband component We note that the PMI was excluded from the CSI exchange report [1]. The justification for this exclusion was to minimize the overhead and the fact that PMI can depend on fast changing channel information, thus reducing its utility over non ideal backhaul with a higher latency. However, in the absence of PMI the use of RI is limited. Indeed, any rank greater than 1 will convey only 2 CQI(s), one for each of the two codewords. No further information about the (average) spatial directions seen by that UE can be deduced by the eNB receiving the report. As a result, reporting the RI should be made optional. Moreover, the eNB requesting the CSI report (eN1) should be able to specify whether or not it would like to receive RI reports. Similarly, the eNB requesting the CSI reports should be able to specify whether or not it requires subband specific CQI reports. This can be achieved by setting a bit (in the measurement request) to be 0 if rank is not requested and 1 otherwise. Another bit can be set to 0 if subband CQIs are not requested and 1 otherwise. In this context, we note that since the requesting eNB has no control over how the sending eNB (eNB2) configures CSI processes (and constituent feedback modes) for its users, it should be in any case able to exploit different type of CSI reports (wideband only or wideband and sub-band).

Proposal: Include optional IE in resource status request indicating whether RI and/or subband CQI should be sent in the resource status response message.

Implementation based processing of the short-term CSI (received via over-the-air signaling) by the sending eNB, prior to CSI exchange has been agreed. In this context, we believe that reporting full (complete) CQI (with 16 possibilities), where each such CQI follows the definition of a 4 bit CQI (Cf. TS 36.213), for each indicated subband instead of differential CQI is useful. This has main two advantages. It allows the sending eNB full freedom in obtaining these CQIs. Indeed, it is desirable to not impose restrictions on sending eNB2 on how it processes or combines reports from multiple different feedback modes configured for a UE under the same CSI process. Secondly, the receiving eNB can be agnostic to the configured feedback modes. This latter point is important because when aperiodic feedback mode 3-1 is configured for the UE (by eNB2), the UE reported sub band CQI is encoded differentially with respect to the corresponding wideband CQI using 2 bits representing differential values {−2, 0, 1, 2}. On the other hand, in the case of aperiodic feedback mode 2-0 or 2-2, only the best M-average CQI is reported by the UE by differentially encoding it with respect to a corresponding wideband CQI, using 2 bits representing differential values {1, 2, 3, 4}. Further, in case of periodic feedback mode 2-1 the CQI corresponding to codeword-1 for each UE selected subband within a bandwidth part can itself be of 4 bits, whereas that of codeword-2 (when RI>1) is differentially encoded with respect to CQI of codeword-1 using 3 bits.

It becomes apparent from the above discussion that a transparent way of conveying CQI (without having to convey all details regarding to one or more feedback modes configured under that CSI process for that UE) is to allow for full (complete) CQI for each indicated subband.

Proposal: Convey each subband CQI using full representation (4 bits or 16 possibilities)

Next, we consider subband indexing and propose an alternative in which the subband selection (including their sizes, indices) is conveyed by means of a combinatorial index which is described next.

This idea is a simple extension of that used in TS 36.213 for aperiodic feedback mode 2-*. In particular, depending on the number of PRBs (or RBs for short) in the downlink available at sending eNB2 (a parameter which is known or conveyed separately to the receiving eNB1), the set of all possible subband selections that can be made together with the subband sizes for all feedback modes can be deduced by eNB1.

For example when 110 RBs are available at eNB2 (and this number is conveyed to eNB1) eNB1 can deduce that for a UE configured under:

Aperiodic, Mode 2-*: 6 UE selected subband indices

A subframe is composed of 28 subbands. Among 28 subbands, 6 subbands are selected by the UE. The number of PRBs in the subbands is 4 except for the last one; the number of PRBs in the last subband is 2 (4*27+2=110).

For Aperiodic, Mode 3-*: 14 higher layer-configured sub bands

A subframe is composed of 14 subbands. The number of PRBs in the subband is 8 except for the last one; the number of PRBs in the last subband is 6 (8*13+6=110).

For Periodic, Mode 2-*: 4 UE selected subband indices (with an additional constraint on choosing one sub band per bandwidth portion or part)

A subframe is composed of 14 subbands. Among 14 subbands, 4 subbands are selected by the UE. The number of PRBs in the subbands is 8 except for the last one; the number of PRBs in the last subband is 6 (8*13+6=110).

Then, considering all possible feasible subband selections under all the aforementioned feedback modes, it is possible to assign a unique label to each distinct feasible selection of sub bands. All possible such labels together decide the range of a combinatorial index R. As a result, knowing the value of R the receiving eNB can deduce the subband selection. The associated CQIs (one for each subband in the indicated selection) can be ordered in the increasing order of the frequency range represented by the indicated subbands. Each such CQI can be conveyed using full representation (i.e., using 16 possibilities) which can then be directly used by the receiving eNB1.

Proposal: Convey subband indexing and size information via a combinatorial index.

Another issue that is important, is to ensure that the RI and CQIs conveyed by eNB2 to eNB1 in a UE CSI report are mutually consistent, i.e., all the reported CQIs are computed by the UE for the same RI (which is identical to the one in the Rank Indication IE when the latter is present). This issue is important to address because under certain feedback modes (such as periodic mode 2-1) the RI and the wideband CQI(s) as well as the subband CQI(s) for one or more bandwidth portions can be reported by the UE on different subframes. Thus, depending on the periodicity defined by eNB1 in its CSI request, it can happen that the latest RI available for the UE under the CSI process, can be different from the one for which one or more of the most recently available CQI(s) are computed. In such a case, the sending eNB2 should ensure that its CSI report is consistent, for instance by using the RI value for which the most recently available CQI(s) have been computed.

Proposal: Sending eNB must ensure RI and CQI(s) conveyed in a CSI report are mutually consistent.

One of the goals of CSI exchange is to facilitate centralized RRM. In a scenario with centralized RRM, the central node receiving the CSI reports should be able to keep track of the CSI information received for each particular UE, over all the received CSI reports. In order to ensure this, it has been agreed that a UE identifier will be included in each CSI report for each UE whose CSI is conveyed in that report. This ID should enable the receiving node to deduce which ones among all the reports that it receives, belongs to that user, thereby facilitating RRM. Including a similar UE ID in the reference signal received power (RSRP) reports will also be beneficial and allow the receiving eNB to combine or jointly exploit these two sets of reports.

Proposal: Include UE ID in RSRP measurement report

Proposals:

9.1.2.11 Resource Status Request

This message is sent by an $eNB_1$ to a neighbouring $eNB_2$ to initiate the requested measurement according to the parameters given in the message.

Direction: $eNB_1 \rightarrow eNB_2$.

TABLE C1

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ... ) | Allocated by $eNB_1$ | YES | reject |
| eNB2 Measurement ID | C-ifRegistrationRequestStop | | INTEGER (1 ... 4095, ... ) | Allocated by $eNB_2$ | YES | ignore |
| Registration Request | M | | ENUMERATED (start, stop, ... ) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB Periodic, | YES | reject |

TABLE C1-continued

| | | | | | | |
|---|---|---|---|---|---|---|
| | | | | Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Xth Bit = UE-CSI Periodic. Other bits shall be ignored by the eNB$_2$. | | |
| Cell To Report | | 1 | | Cell ID list for which measurement is needed | YES | ignore |
| >Cell To Report Item | | 1 . . . <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, . . . ) | | YES | ignore |
| Partial Success Indicator | O | | ENUMERATED (partial success allowed, . . . ) | Included if partial success is allowed | YES | ignore |
| CSI Measurement Report type | O | | BITSTRING (SIZE(2)) | Each position in the bitmap indicates the type of CSI measurement to report. First bit = Rank, Second bit = subband CQI. | YES | ignore |
| Reporting Periodicity of CSI Measurement Report | O | | ENUMERATED (5 ms, 10 ms, 20 ms, 40 ms, 80 ms, aperiodic, . . . ) | Periodicity for CSI Measurement Report Periodic | YES | ignore |

TABLE C1-continued

| | Explanation |
|---|---|
| Condition | |
| ifRegistrationRequestStop | This IE shall be present if the Registration Request IE is set to the value "stop". |
| Range bound | |
| maxCellineNB | Maximum no. cells that can be served by an eNB. Value is 256. |

9.1.2.14 Resource Status Update

This message is sent by $eNB_2$ to neighbouring $eNB_1$ to report the results of the requested measurements.

Direction: $eNB_2 \rightarrow eNB_1$.

9.2.aa UE-CSI Report

This IE provides UE-CSI information for a set of UEs served by $eNB_2$.

TABLE C2

| IE/Group Name | Presence | Range | IE type and reference | Semantics description |
|---|---|---|---|---|
| CSI Report per UE | | 1 ... <maxUEReport> | | |
| >UE ID | M | | BIT STRING (SIZE (16)) | ID of the UE served by the cell in $eNB_2$. |
| >CSI report per CSI process | | 1 ... <maxCSIprocess> | | |
| >>Rank Indicator | O | | INTEGER (1 ... 8, ... ) | The rank indicator IE is present only if it is requested in the associated request. In that case Cf. TS 36.213 [7.2.3]. |
| >>Wideband CQI For Codeword 0 | M | | INTEGER (0 ... 15, ... ) | |
| >>Wideband CQI For Codeword 1 | O | | INTEGER (0 ... 15, ... ) | |
| >>combinatorial index | O | | Integer FFS | This IE is present only if associated request wants subband CQI |
| >>>Subband CQI List | | 0 ... <maxCQISubbands > | | The number of subbands in the list as well as their respective indices and sizes are deduced from the combinatorial index. Subband CQIs are sorted in the order of increasing frequency. |
| >>>>Subband CQI for codeword 0 | M | | INTEGER (0 ... 15, ... ) | |
| >>>>Subband CQI for codeword 1 | O | | INTEGER (0 ... 15, ... ) | |
| >>UE-CSI process Configuration information | M | | FFS | CSI process configuration information. |

We now consider eRNTP exchange.

It has been agreed that eRNTP will be delivered with the Load Information message.

In the following, we provide our views on content of this message, as well as a proposal.

C3. Discussion

C3.1 eRNTP Exchange

One concern is that a receiving eNB does not have the means to differentiate the "meaning" of the CoMP hypothesis. In particular, a potential issue is that the signaled hypothesis could be a "suggestion" by the sender or an "action" which implies that the pattern in the hypothesis will be applied. A proposed solution to this issue is to introduce an indicator IE in the CoMP Information IE to convey that the constituent resource allocation is an action. This proposal can be useful if a common pre-configured threshold is used (or implicitly assumed) with or with our this indicator IE. In other words, the "suggestion for" as well as the "action" by an eNB (or cell) are based on a common threshold (pre-configured for that eNB or cell and known to its neighbors). Another slightly more preferable option is to enhance and use the existing RNTP in order to convey the "action". The enhancements can be done in two ways. The contents are captured in two corresponding proposals attached in the sequel.

The first presented proposal is based on a single threshold and exploits that fact that the RNTP (i.e., downlink (DL) power restriction) for the first subframe (subframe #0) is always conveyed. Then, if no information about the DL power restriction on any subsequent subframe is conveyed, the one conveyed for the first subframe can be assumed to remain static (i.e., applicable over subsequent subframes).

The second proposal is based one multiple thresholds. The point here is that since the choice '11' already indicates no promise on the power level (which covers the case of transmit power being arbitrarily high) we can use three thresholds (instead of two), since there is no need to convey that the power level is greater than HPTH (as this is subsumed by '11')

Proposal:

9.2.19 Relative Narrowband Tx Power (RNTP)

This IE provides an indication on DL power restriction per PRB in a cell and other information needed by a neighbour eNB for interference aware scheduling.

TABLE C3

| IE/Group Name | Presence | Range | IE type and reference | Semantics description | Criticality | Assigned Criticality |
|---|---|---|---|---|---|---|
| RNTP Per PRB | M | | BIT STRING (6 . . . 110, . . . ) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the first subframe. In case the DL power restriction is static, the indicated DL power restriction is maintained over the subsequent subframes. | — | — |
| RNTP Threshold | M | | ENUMERATED (−∞, −11, −10, −9, −8, −7, −6, −5, −4, −3, −2, −1, 0, 1, 2, 3, . . . ) | $RNTP_{threshold}$ is defined in TS 36.213 [11]. | — | — |
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . . ) | $P_B$ is defined in TS 36.213 [11]. | — | — |
| PDCCH Interference Impact | M | | INTEGER (0 . . . 4, . . . ) | Measured by Predicted Number Of Occupied PDCCH OFDM Symbols (see TS 36.211 [10]). Value 0 means "no prediction is available". | — | — |
| Extended RNTP Per PRB | O | | BIT STRING (6 . . . 4290, . . . ) | Each position in the bitmap represents a PRB in a subframe, for which value "1" indicates 'no |

TABLE C3-continued

| IE/Group Name | Presence | Range | IE type and reference | Semantics description | Criticality | Assigned Criticality |
|---|---|---|---|---|---|---|
| | | | | promise on the Tx power is given' and value "0" indicates 'Tx not exceeding RNTP threshold.' The first bit corresponds to PRB 0 of the first subframe for which the extended RNTP per PRB IE is valid, the second bit corresponds to PRB 1 of the first subframe for which the extended RNTP per PRB IE is valid, and so on. The length of the bit string is an integer (maximum 39) multiple of nDLRB, which is defined in TS 36.211 [10]. The bit string may span across multiple contiguous subframes. The pattern across contiguous subframes (formed by RNTP per PRB and extended RNTP per PRB) is continuously repeated | | |
| RNTP per PRB start time | | 0 ... 1 | | | | |
| >Starting SFN | M | | INTEGER (0 ... 1023, ... ) | SFN of the radio frame containing the first subframe when the RNTP Per PRB IE is valid. | | |
| >Starting Subframe Index | M | | INTEGER (0 ... 9, ... ) | Subframe number, within the radio frame indicated by the Start SFN IE, of the first subframe when the RNTP Per PRB IE is valid. | | |

The second alternative is given below.

TABLE C4

| IE/Group Name | Presence | Range | IE type and reference | Semantics description | Criticality | Assigned Criticality |
|---|---|---|---|---|---|---|
| ERNTP Per PRB and subframe | M | | BIT STRING (12 ... 220, ... ) | Each position in the bitmap represents a PRB in a subframe, for which the value "xx" indicates how the transmission power in a | — | — |

TABLE C4-continued

| IE/Group Name | Presence | Range | IE type and reference | Semantics description | Criticality | Assigned Criticality |
|---|---|---|---|---|---|---|
| | | | | resource block is mapped relative to the three power thresholds: 00—power level not exceeding the LPTH 01—power level between LPTH and MPTH; 10—power level between MPTH and HPTH; 11—no promise on the Tx power is given. The first 2 bits correspond to PRB 0 of the first subframe for which the IE is valid, the following 2 bits correspond to PRB 1 of the first subframe for which the IE is valid, and so on. The bit string may span across multiple contiguous subframes. The length of the bit string is an integer (maximum 40) multiple of nDLRB. The parameter is defined in TS 36.211 [10]. The ERNTP pattern is continuously repeated with a periodicity indicated in Periodicity. | | |
| Transmitted power levels | | | | | | |
| LPTH (Low Power Threshold) | M | | ENUMERATED ($-\infty$, $-11$, $-10$, $-9$, $-8$, $-7$, $-6$, $-5$, $-4$, $-3$, $-2$, $-1$, 0, 1, 2, 3, . . . ) | Lower RNTP power threshold, using the $RNTP_{threshold}$ defined in TS 36.213 [11]. | — | — |
| MPTH (Medium Power Threshold) | M | | ENUMERATED ($-\infty$, $-11$, $-10$, $-9$, $-8$, $-7$, $-6$, $-5$, $-4$, $-3$, $-2$, $-1$, 0, 1, 2, 3, . . . ) | Medium RNTP power threshold, using the $RNTP_{threshold}$ defined in TS 36.213 [11]. | | |
| HPTH (High Power Threshold) | M | | ENUMERATED ($-\infty$, $-11$, $-10$, $-9$, $-8$, $-7$, $-6$, $-5$, $-4$, $-3$, $-2$, $-1$, 0, 1, 2, 3, . . . ) | Higher RNTP power threshold, using the $RNTP_{threshold}$ defined in TS 36.213 [11]. | | |
| Subframe sequence definition | | | | | | |
| >Start SFN | M | | INTEGER (0 . . . 1023) | SFN of the radio frame containing the first subframe where the RNTP | | |

TABLE C4-continued

| IE/Group Name | Presence | Range | IE type and reference | Semantics description | Criticality | Assigned Criticality |
|---|---|---|---|---|---|---|
| >Start Subframe Number | M | | INTEGER (0 . . . 39) | Per PRB Per Subframe IE is valid. Subframe number, within the radio frame indicated by the Start SFN IE, of the first subframe when the RNTP Per PRB Per Subframe IE is valid. | | |
| No. of subframes | M | | 1 . . . 40 | No. of subframes for which is defined the bitstream | | |
| Periodicity | | | 1 . . . 40 | The number of subframes after which the bit pattern is repeated | | |
| Number Of Cell-specific Antenna Ports | M | | ENUMERATED (1, 2, 4, . . . ) | P (number of antenna ports for cell-specific reference signals) defined in TS 36.211 [10] | | |
| P_B | M | | INTEGER (0 . . . 3, . . . ) | $P_B$ is defined in TS 36.213 [11]. | | |

Embodiment D

D1. Introduction

In the following we provide our views on CSI and eRNTP exchange, as well as proposals containing the required message structures.

D2. Discussion

D2.1 CSI Exchange: Configuring CSI Processes

The concept of CSI processes was defined in Rel.11 to enable CSI feedback from a UE to its serving eNB. The CSI feedback is determined for each CSI process according to the serving TP and interference hypothesis configured in that process. Each CSI process that is configured for a UE, comprises a set of resource elements on which non-zero power CSI-RSs are sent and a channel estimate is obtained by that UE using observations received on those resource elements.

In addition, a set of resource elements is also indicated by the CSI process (referred to as interference measurement resources (IMRs)) on which the UE estimates the covariance of the interference it observes. The channel and covariance estimates are together used by the UE to determine and send its feedback report corresponding to that CSI process. Multiple such CSI processes (up-to 4) can be configured for a UE, each process corresponding to a different choice of signal or interference hypothesis. Moreover, in the scenario in which fast switching of the serving TP is not possible, different CSI processes that are configured for any given UE typically correspond to different choices of interference hypothesis.

Note from the brief discussion above that in the event the interference hypothesis of a configured CSI process presumes muting from a TP (that is a dominant interferer for the UE of interest) which is controlled by the neighboring eNB, coordination among the eNBs is required in order to ensure that the interference estimated by the UE on the constituent IMRs is consistent with the assumed hypothesis. Another similar event that requires coordination is if the non-zero power CSI-RSs indicated in the CSI process must be interference protected in order to ensure reliable channel estimation at the UE. In both these events, the dominant interferer that is controlled by the neighboring eNB must be muted on certain resource elements. Thus, a mechanism (with appropriate signaling) should be available to share the CSI-RS (comprising non-zero power CSI-RSs and IMRs) configurations between eNBs, which would facilitate configuration of CSI processes across multiple eNBs.

Once the CSI processes are configured, the CSI exchanged among eNBs over the backhaul should include the respective CSI process configuration information, in order to convey the conditions under which the CSI was measured by the UE. This configuration information includes non-zero power CSI-RS information and IMR information (comprising the subframe indices and zero-power CSI-RS information). Since this configuration is anyway informed to the UE via RRC (or higher layer) signaling, the same information can be reused as a container to convey the configuration to the neighboring eNB.

Another way of conveying this configuration information is through a look-up-table. A look-up-table mapping an index to one or more distinct applied CSI process configurations can be constructed for each eNB. Here, by an applied CSI process we mean a process that is used by at-least one UE served by that eNB to measure its CSI. Such a table can be exchanged among neighbors first and from then on the configuration information can be exchanged via indices. The total number of configurations in the table can be limited in order to limit signaling overhead.

Suitable values for the number of configurations in this table are either 8 or 16 or 32.

D2.2 CSI Exchange: Contents

One eNB can send CSI report pertaining to one or more of UEs to a neighboring eNB. For each UE, the CSI that the eNB sends to a neighbor can comprise:

CQI: up-to 2 CQIs, each including a wideband component and possible sub-band differential components RI: one wideband component We note that the PMI was excluded from the CSI exchange report [1]. The justification for this exclusion was to minimize the overhead and the fact that PMI can depend on fast changing channel information, thus reducing its utility over non ideal backhaul with a higher latency. However, in the absence of PMI the use of RI is limited. Indeed, any rank greater than 1 will convey only 2 CQI(s), one for each of the two codewords. No further information about the (average) spatial directions seen by that UE can be deduced by the eNB receiving the report. As a result, reporting the RI should be made optional. Moreover, the eNB requesting the CSI report should be able to specify whether or not it would like to receive RI reports. Similarly, the eNB requesting the CSI reports should be able to specify whether or not it requires subband specific CQI reports. This can be achieved by setting a bit (in the measurement request) to be 0 if rank is not requested and 1 otherwise. Another bit can be set to 0 if subband CQIs are not requested and 1 otherwise.

Processing (filtering or subsampling) of the short-term CSI (received via over-the-air signaling) at an eNB prior to exchange should be permitted.

One use case for this is when the periodicity of the CSI report that is requested by eNB1 to its neighbor eNB2, is larger than the over-the-air CSI signaling periodicity configured by eNB2. In this case eNB2 has to do some processing (such as subsampling or averaging) of the reports it receives before it sends it to eNB1. In this context, we note that the subsampling employed by eNB2 should be understood by eNB1 (if needed additional signaling can be added to ensure this). One possible way this can be accomplished (without any signaling overhead) is for eNB2 to use the subsampling factor determined by a pre-determined rule (known to or configured for all eNBs in advance) that outputs a subsampling factor, given the requested periodicity and CSI process configuration as inputs. On the other hand, averaging or scaling or filtering employed by eNB2 can be transparent to the receiving eNB1.

One of the goals of CSI exchange is to facilitate centralized RRM [3]. In a scenario with centralized RRM, the central node receiving the CSI reports should be able to keep track of the CSI information received for each particular UE, over all the received CSI reports. This can be achieved by including a UE identifier in each CSI report for each UE whose CSI is conveyed in that report. We want to include a unique ID for each user so that the receiving node knows which ones among all the reports that it receives, belong that user. This will be useful for RRM. Otherwise the receiving eNB will regard each received report as belonging to a distinct user. This can lead to sub-optimal resource allocation.

D2.3 eRNTP Exchange

Our view on eRNTP exchange is captured in a corresponding proposal attached in the end of this embodiment.

We note that the RNTP (i.e., downlink (DL) power restriction) for the first subframe is always conveyed. If no information about the DL power restriction on any subsequent subframe is conveyed, then the one conveyed for the first subframe can be assumed to remain static (i.e., applicable over subsequent subframes).

We also present several variations, one of which includes the use of multiple thresholds D3. Conclusion We discussed the necessary X2 message to support CSI and eRNTP exchange for inter-eNB CoMP and presented corresponding proposals.

Proposal:

9.1.2.11 Resource Status Request

This message is sent by an $eNB_1$ to a neighbouring $eNB_2$ to initiate the requested measurement according to the parameters given in the message.

Direction: $eNB_1 \rightarrow eNB_2$.

TABLE D1

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ... ) | Allocated by $eNB_1$ | YES | reject |
| eNB2 Measurement ID | C-ifRegistrationRequestStop | | INTEGER (1 ... 4095, ... ) | Allocated by $eNB_2$ | YES | ignore |
| Registration Request | M | | ENUMERATED (start, stop, ... ) | A value set to "stop", indicates a request to stop all cells measurements. | YES | reject |
| Report Characteristics | O | | BITSTRING (SIZE(32)) | Each position in the bitmap indicates measurement object the $eNB_2$ is requested to report. First Bit = PRB Periodic, Second Bit = TNL load Ind Periodic, Third Bit = HW | YES | reject |

TABLE D1-continued

| IE/Group Name | Presence | Range | IE type and reference | Semantics description | Criticality | Assigned Criticality |
|---|---|---|---|---|---|---|
| | | | | Load Ind Periodic, Fourth Bit = Composite Available Capacity Periodic, this bit should be set to 1 if at least one of the First, Second or Third bits is set to 1, Fifth Bit = ABS Status Periodic, Xth Bit = UE-CSI Periodic. Other bits shall be ignored by the eNB$_2$. | | |
| Cell To Report | | 1 | | Cell ID list for which measurement is needed | YES | ignore |
| >Cell To Report Item | | 1 ... <maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, ...) | | YES | ignore |
| Partial Success Indicator | O | | ENUMERATED (partial success allowed, ...) | Included if partial success is allowed | YES | ignore |
| CSI Measurement Report type | O | | BITSTRING (SIZE(2)) | Each position in the bitmap indicates the type of CSI measurement to report. First bit = Rank, Second bit = subband CQI. | YES | ignore |
| ((Reporting Periodicity of CSI Measurement Report | O | | ENUMERATED (5 ms, 10 ms, 20 ms, 40 ms, 80 ms, aperiodic, ...) | Periodicity for CSI Measurement Report Periodic | YES | ignore |

| | Explanation |
|---|---|
| Range bound | |
| maxCellineNB | Maximum no. cells that can be served by an eNB. Value is 256. |
| Condition | |
| ifRegistrationRequestStop | This IE shall be present if the Registration Request IE is set to the value "stop". |

9.1.2.14 Resource Status Update
This message is sent by eNB$_2$ to neighbouring eNB$_1$ to report the results of the requested measurements.
Direction: eNB$_2$→eNB$_1$.

TABLE D2

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by eNB$_1$ | YES | reject |
| eNB2 Measurement ID | M | | INTEGER (1 ... 4095, ...) | Allocated by eNB$_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >> UE-CSI Report | O | | 9.2.x1 | | YES | ignore |

| Range bound | Explanation |
|---|---|
| maxCellineNB | Maximum no. cells that can be served by an eNB. Value is 256. |

9.2.x1 UE-CSI Report
This IE provides UE-CSI information for a set of UEs served by eNB$_2$.

TABLE D3

| IE/Group Name | Presence | Range | IE type and reference | Semantics description |
|---|---|---|---|---|
| UE subset CSI Report | | 1 ... <maxUEsubsetCSIReport> | | |
| >UE ID | M | | BIT STRING (SIZE (16)) | ID of the UE served by the cell in eNB$_2$. |
| >UE-CSI process information | | 1 ... <maxUE-CSIprocess> | | |
| >Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | Cf. TS 36.213 [7.2.3]. |
| >>Wideband CQI For Codeword 1 | O | | BIT STRING (SIZE (4)) | Cf. TS 36.213 [7.2.3]. |

TABLE D3-continued

| | | | | |
|---|---|---|---|---|
| >>Subband CQI List | | 0 . . . <maxCQISubbands> | | This IE is present only if associated request wants subband CQI |
| >>>Subband CQI for codeword 0 | O | | BIT STRING (SIZE (2)) | Cf. TS 36.213 [7.2.3]. |
| >>>Subband CQI for codeword 1 | O | | BIT STRING (SIZE (2)) | Cf. TS 36.213 [7.2.3]. |
| >>UE-CSI process Configuration information | M | | FFS | CSI process configuration information. |

| Range bound | Explanation |
|---|---|
| maxUEsubsetCSIReport | Maximum UE subset size for which UE-CSI can be reported. The value is 32. |
| maxUE-CSIProcess | Maximum number of CSI processes per-UE. The value is 4. |
| maxCQISubbands | Maximum number of subbands for UE CQI reporting. The value is 28. |

Alternatively, the parameter maxUEsubsetCSIReport can be 8 or 64. Further, optionally, the UE-ID can have a more compact representation using say 8 bits or 6 bits or 5 bits (equivalently 256 or 64 or 32 possible indices from a configurable table).

Next, we consider the case when subband indices have to be indicated. This is important to accommodate feedback modes that involve UE selected subband feedback.

Note that as an alternative in the above tables, for each CQI the bit string field of 4 bits (2 bits) can be replaced by INTEGER (0 . . . 15, . . . ) (INTEGER (0 . . . 7, . . . )).

In another alternative the sub band indices can be conveyed by means of a combinatorial index which is described next.

The idea here is that depending on the number of PRBs (or RBs for short) in the downlink available at sending eNB2

TABLE D4

| IE/Group Name | Presence | Range | IE type and reference | Semantics description |
|---|---|---|---|---|
| UE subset CSI Report | | 1 . . . <maxUEsubsetCSIReport> | | |
| >C-RNTI | M | | BIT STRING (SIZE (16)) | ID of the UE served by the cell in eNB$_2$. Defined in TS 36.331. |
| >UE-CSI process information | | 1 . . . <maxUE-CSIprocess> | | |
| >>Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | |
| >>Wideband CQI For Codeword 1 | O | | BIT STRING (SIZE (4)) | |
| >>Subband CQI List | | 0 . . . <maxCQISubbands> | | This IE is present only if associated request wants subband CQI |
| >>>Subband CQI for codeword 0 | O | | BIT STRING (SIZE (4)) | |
| >>>Subband CQI for codeword 1 | O | | BIT STRING (SIZE (4)) | |
| >>>Subband index | O | | INTEGER (0 . . . 27, . . . ) | Included in case of UE selected subband CQI reporting. |
| >>UE-CSI process Configuration information | M | | FFS | CSI process configuration information. |

(a parameter which is known or conveyed separately to the receiving eNB1), the set of all possible subband selections that can be made together with the subband size for each feedback mode can be deduced by eNB1.

For example when 110 RBs are available at eNB2 (and this number is conveyed to eNB1) eNB1 can deduce that for a UE configured under:

Aperiodic, Mode 2-*: 6 UE selected subband indices

A subframe is composed of 28 subbands. Among 28 subbands, 6 subbands are selected by the UE. The number of PRBs in the subbands is 4 except for the last one; the number of PRBs in the last subband is 2 (4*27+2=110).

For Aperiodic, Mode 3-*: 14 higher layer-configured sub bands

A subframe is composed of 14 subbands. The number of PRBs in the subband is 8 except for the last one; the number of PRBs in the last subband is 6 (8*13+6=110).

For Periodic, Mode 2-*: 4 UE selected subband indices (with an additional constraint on choosing one sub band per bandwidth portion or part)

A subframe is composed of 14 subbands. Among 14 subbands, 4 subbands are selected by the UE. The number of PRBs in the subbands is 8 except for the last one; the number of PRBs in the last subband is 6 (8*13+6=110).

Then, considering all possible feasible subband selections under all the aforementioned feedback modes, it is possible to assign a unique label to each distinct feasible selection of sub bands. All possible such labels together decide the range of a combinatorial index R. As a result, knowing the value of R the receiving eNB can deduce the subband selection. The associated CQIs (one for each subband in the indicated selection) can be ordered in the increasing order of the frequency range represented by the indicated subbands. Each such CQI can be conveyed using full representation (i.e., using 16 possibilities) which can then be directly used by the receiving eNB1.

TABLE D5

| IE/Group Name | Presence | Range | IE type and reference | Semantics description |
|---|---|---|---|---|
| UE subset CSI Report | | 1 . . . <maxUEsubsetCSIReport> | | |
| >C-RNTI | M | | BIT STRING (SIZE (16)) | ID of the UE served by the cell in eNB$_2$. Defined in TS 36.331. |
| >UE-CSI process information | | 1 . . . <maxUE-CSIprocess> | | |
| >>Rank Indicator | O | | BIT STRING (SIZE (3)) | The rank indicator IE is present only if it is requested in the associated request. In that case Cf. TS 36.213 [7.2.3]. |
| >>Wideband CQI For Codeword 0 | M | | BIT STRING (SIZE (4)) | |
| >>Wideband CQI For Codeword 1 | O | | BIT STRING (SIZE (4)) | |
| >> combinatorial index | O | | Integer FFS | This IE is present only if associated request wants subband CQI |
| >>>Subband CQI List | | 0 . . . <maxCQISubbands> | | The number of subbands in the list as well as their respective indices and sizes are deduced from the combinatorial index. |
| >>>>Subband CQI for codeword 0 | M | | BIT STRING (SIZE (4)) | |
| >>>>Subband CQI for codeword 1 | O | | BIT STRING (SIZE (4)) | |
| >>UE-CSI process Configuration information | M | | FFS | CSI process configuration information. |

UE Configuration Independent Coding Structure

A coding structure for signaling CSI over X2 in a UE-configuration independent way is shown in Table I1. In this structure, a subband is defined as a set of contiguous PRBs having the same CQI value. The subband partitioning is left to the sending eNB2 implementation, and is not restricted by the UE's CSI reporting configuration. Each indicated CQI follows the definition of a 4 bit CQI (Cf. TS 36.213). This allows for the sending eNB2 to process the CSI it receives from the UE in any manner as long as each indicated CQI is consistent with the basic CQI definition. The receiving eNB1 can directly use these CQIs while being agnostic to how they were procured and processed by eNB1.

TABLE D6

UE configuration independent coding structure

| IE/Group Name | Presence | Range | IE type and reference | Semantics description |
|---|---|---|---|---|
| CSI per UE | | 1 . . . <maxnoofUE-CSI> | | |
| >C-RNTI | M | | BIT STRING (SIZE (16)) | |
| >CSI per Interference Hypotheses | | 1 . . . <maxnoofInterferenceHypothesis> | | |
| >>Interference Hypothesis Information | M | | [FFS] | |
| >>Wideband CQI for Codeword 0 | M | | INTEGER(0 . . . 15, . . . ) | |
| >>Wideband CQI for Codeword 1 | O | | INTEGER(0 . . . 15, . . . ) | |
| >>Rank Indication | M | | INTEGER(1 . . . 8, . . . ) | Defined in TS 36.213 [11]. |
| >>Subband CQI List | | 0 . . . <maxnoofSubband> | | Subbands are listed in the order of increasing frequency. |
| >>>Subband Start | O | | INTEGER(0 . . . 109, . . . ) | PRB number of the first PRB in the subband. If this IE is not present, the subband is contiguous with the previous subband in the list, or starts with PRB 0 if this is the first subband in the list. |
| >>>Subband Size | O | | INTEGER(1 . . . 110, . . . ) | Number of contiguous PRBs in the subband. If this IE is not present, the value is the same as the previous subband in the list. |
| >>>Subband CQI for Codeword 0 | M | | INTEGER(0 . . . 15, . . . ) | |
| >>>Subband CQI for Codeword 1 | O | | INTEGER(0 . . . 15, . . . ) | |

We note here that reporting full (complete) CQI (with 16 possibilities) for each indicated subband CQI instead of differential CQI is useful since otherwise the receiving eNB1 may not know how to combine a corresponding wideband CQI and differential sub-band CQI (with fewer than 16 possibilities) in order to obtain the full CQI for that subband, for instance, in the case that the precise feedback mode configured for the UE of interest under that CSI process is not conveyed to the receiving eNB1. We note here also that it might be desirable to not impose restrictions on sending eNB2 on how it combines reports from multiple different feedback modes configured for that UE under the same CSI process. Then, note that when aperiodic feedback mode 3-1 is configured for the UE (by eNB2), the UE reported sub band CQI is encoded differentially with respect to the corresponding wideband CQI using 2 bits representing differential values {−2, 0, 1, 2}. On the other hand, in the case of aperiodic feedback mode 2-0 or 2-2, only the best M-average is reported by the UE by differentially encoding it with respect to a corresponding wideband CQI using 2 bits representing differential values {1, 2, 3, 4}. Further, in case of periodic feedback mode 2-1 the CQI corresponding to codeword-1 for each UE selected subband within a bandwidth part can itself be of 4 bits, whereas that of codeword-2 (when RI>1) is differentially encoded with respect to CQI of codeword-1 using 3 bits.

It becomes apparent from the above discussion that a transparent way of conveying CQI (without having to convey all details regarding to one or more feedback modes configured under that CSI process for that UE) is to allow for full (complete) CQI for each indicated subband.

Another issue that is important, is to ensure that the RI and CQIs conveyed by eNB2 to eNB1 in a UE CSI report are mutually consistent, i.e., all the reported CQIs are computed by the UE for the same RI (which is identical to the one in the Rank Indication IE when the latter is present). This issue is important to address because under certain feedback modes (such as periodic mode 2-1) the RI and the wideband CQI(s) as well as the subband CQI(s) for one or more bandwidth portions can be reported by the UE on different subframes. Thus, depending on the periodicity defined by eNB1 in its CSI request, it can happen that the latest RI available for the UE under the CSI process, can be different from the one for which the most recent CQI(s) are computed. In such a case, the sending eNB2 should ensure that its CSI report is consistent, for instance by using the RI value for which the most recently available CQI(s) have been computed.

The variation (which allows the requesting eNB to specify whether or not it wants to receive subband CQI(s) or Rank Indication is provided below. In this context, we note that since the requesting eNB1 has no control over how eNB2 configures CSI processes (and constituent feedback modes) for its users, it should be in any case able to exploit different type of CSI reports (wideband only or wideband and subband).

TABLE D7

| IE/Group Name | Presence | Range | IE type and reference | Semantics description |
|---|---|---|---|---|
| CSI per UE | | 1 . . . <maxnoofUE-CSI> | | |
| >C-RNTI | M | | BIT STRING (SIZE (16)) | |
| >CSI per Interference Hypotheses | | 1 . . . <maxnoofInterferenceHypothesis> | | |
| >>Interference Hypothesis Information | M | | [FFS] | |
| >>Wideband CQI for Codeword 0 | M | | INTEGER(0 . . . 15, . . . ) | |
| >>Wideband CQI for Codeword 1 | O | | INTEGER(0 . . . 15, . . . ) | |
| >>Rank Indication | O | | INTEGER(1 . . . 8, . . . ) | The rank indication IE is present only if it is requested in the associated request. In that case it follows the definition in TS 36.213 [11]. |
| >>Subband CQI List | | 0 . . . <maxnoofSubband> | | This IE is present only if associated request wants subband CQI. In that case subbands are listed in the order of increasing frequency. |
| >>>Subband Start | O | | INTEGER(0 . . . 109, . . .) | PRB number of the first PRB in the subband. If this IE is not present, the subband is contiguous with the previous subband in the list, or starts with PRB 0 if this is the first subband in the list. |
| >>>Subband Size | O | | INTEGER(1 . . . 110, . . . ) | Number of contiguous PRBs in the subband. If this IE is not present, the value is the same as the previous subband in the list. |
| >>>Subband CQI for Codeword 0 | M | | INTEGER(0 . . . 15, . . . ) | |
| >>>Subband CQI for Codeword 1 | O | | INTEGER(0 . . . 15, . . . ) | |

Another variation which allows for further simplification at the expense of not being bit efficient is as follows. Here the full CQIs for all possible subbands (which can be determined by the number of PRBs in the downlink available at eNB2) are always conveyed for a UE under the CSI process. In case the sub band CQI is not reported by a UE under the configured feedback mode for a subband, the sending eNB2 simply uses the wideband CQI value for that subband.

9.2.19 Relative Narrowband Tx Power (RNTP)

This IE provides an indication on DL power restriction per PRB in a cell and other information needed by a neighbour eNB for interference aware scheduling.

TABLE D8

| IE/Group Name | Presence | Range | IE type and reference | Semantics description | Criticality | Assigned Criticality |
|---|---|---|---|---|---|---|
| RNTP Per PRB | M | | BIT STRING (6 . . . 110, . . . ) | Each position in the bitmap represents a $n_{PRB}$ value (i.e. first bit = PRB 0 and so on), for which the bit | — | — |

TABLE D8-continued

| IE/Group Name | Presence | Range | IE type and reference | Semantics description | Criticality | Assigned Criticality |
|---|---|---|---|---|---|---|
| | | | | value represents RNTP ($n_{PRB}$), defined in TS 36.213 [11]. Value 0 indicates "Tx not exceeding RNTP threshold". Value 1 indicates "no promise on the Tx power is given". This IE is used to indicate DL power restriction per PRB for the first subframe. In case the DL power restriction is static, the indicated DL power restriction is maintained over the subsequent subframes. | | |
| RNTP Threshold | M | | ENUMERATED (−∞, −11, −10, −9, −8, −7, −6, −5, −4, −3, −2, −1, 0, 1, 2, 3, . . . ) | $RNTP_{threshold}$ is defined in TS 36.213 [11]. | — | — |
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . . ) | $P_B$ is defined in TS 36.213 [11]. | — | — |
| PDCCH Interference Impact | M | | INTEGER (0 . . . 4, . . . ) | Measured by Predicted Number Of Occupied PDCCH OFDM Symbols (see TS 36.211 [10]). Value 0 means "no prediction is available". | — | — |
| Extended RNTP Per PRB | O | | BIT STRING (6 . . . 4290, . . . ) | Each position in the bitmap represents a PRB in a subframe, for which value "1" indicates 'no promise on the Tx power is given' and value "0" indicates 'Tx not exceeding RNTP threshold.' The first bit corresponds to PRB 0 of the first subframe for which the extended RNTP per PRB IE is valid, the second bit | | |

TABLE D8-continued

| IE/Group Name | Presence | Range | IE type and reference | Semantics description | Criticality | Assigned Criticality |
|---|---|---|---|---|---|---|
| | | | | corresponds to PRB 1 of the first subframe for which the extended RNTP per PRB IE is valid, and so on. The length of the bit string is an integer (maximum 39) multiple of $N_{RB}^{DL}$. $N_{RB}^{DL}$ is defined in TS 36.211 [10]. The bit string may span across multiple contiguous subframes. The pattern across contiguous subframes (formed by RNTP per PRB and extended RNTP per PRB) is continuously repeated. | | |
| RNTP per PRB start time | | 0 . . . 1 | | | | |
| >Starting SFN | M | | INTEGER (0 . . . 1023, . . . ) | SFN of the radio frame containing the first subframe when the RNTP Per PRB IE is valid. | | |
| >Starting Subframe Index | M | | INTEGER (0 . . . 9, . . . ) | Subframe number, within the radio frame indicated by the Start SFN IE, of the first subframe when the RNTP Per PRB IE is valid. | | |

An alternate Table for RNTP enhancement is given below.

TABLE D9

| IE/Group Name | Presence | Range | IE type and reference | Semantics description | Criticality | Assigned Criticality |
|---|---|---|---|---|---|---|
| RNTP per PRB | M | | BIT STRING (6 . . . 110, . . . ) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no | — | — |

TABLE D9-continued

| IE/Group Name | Presence | Range | IE type and reference | Semantics description | Criticality | Assigned Criticality |
|---|---|---|---|---|---|---|
| | | | | promise on the Tx power is given". This IE is ignored if the RNTP per PRB per subframe IE is present. | | |
| RNTP Threshold | M | | ENUMERATED (−∞, −11, −10, −9, −8, −7, −6, −5, −4, −3, −2, −1, 0, 1, 2, 3, . . . ) | $RNTP_{threshold}$ is defined in TS 36.213 [11]. | — | — |
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . . ) | $P_B$ is defined in TS 36.213 [11]. | — | — |
| PDCCH Interference Impact | M | | INTEGER (0 . . . 4, . . . ) | Measured by Predicted Number Of Occupied PDCCH OFDM Symbols (see TS 36.211 [10]). Value 0 means "no prediction is available". | — | — |
| RNTP Per PRB per subframe | O | | BIT STRING (6 . . . 4400, . . . ) | Each position in the bitmap represents a PRB in a subframe, for which value "1" indicates 'no promise on the Tx power is given' and value "0" indicates 'Tx not exceeding RNTP threshold.' The first bit corresponds to PRB 0 of the first subframe for which the RNTP per PRB per subframe IE is valid, the second bit corresponds to PRB 1 of the first subframe for which the RNTP per PRB per subframe IE is valid, and so on. The length of the bit string is an integer (maximum 40) multiple of $N_{RB}^{DL}$. $N_{RB}^{DL}$ is defined in TS 36.211 [10]. The bit string may span across multiple contiguous subframes. | | |

TABLE D9-continued

| IE/Group Name | Presence | Range | IE type and reference | Semantics description | Criticality | Assigned Criticality |
|---|---|---|---|---|---|---|
| | | | | The pattern across contiguous subframes formed by RNTP per PRB per subframe IE is continuously repeated. | | |
| RNTP per PRB per subframe start time | | 0 . . . 1 | | | | |
| >Starting SFN | M | | INTEGER (0 . . . 1023, . . . ) | SFN of the radio frame containing the first subframe when the RNTP Per PRB Per Subframe IE is valid. | | |
| >Starting Subframe Index | M | | INTEGER (0 . . . 9, . . . ) | Subframe number, within the radio frame indicated by the Start SFN IE, of the first subframe when the RNTP Per PRB Per Subframe IE is valid. | | |

Another alternate Table for RNTP enhancement is given below.

TABLE D10

| IE/Group Name | Presence | Range | IE type and reference | Semantics description | Criticality | Assigned Criticality |
|---|---|---|---|---|---|---|
| RNTP per PRB | M | | BIT STRING (6 . . . 110, . . . ) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is ignored if the RNTP per PRB per subframe IE is present. | — | — |
| RNTP Threshold | M | | ENUMERATED (−∞, −11, −10, −9, −8, −7, −6, −5, −4, −3, −2, −1, 0, 1, 2, 3, . . . ) | $RNTP_{threshold}$ is defined in TS 36.213 [11]. | — | — |

TABLE D10-continued

| IE/Group Name | Presence | Range | IE type and reference | Semantics description | Criticality | Assigned Criticality |
|---|---|---|---|---|---|---|
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . . ) | $P_B$ is defined in TS 36.213 [11]. | — | — |
| PDCCH Interference Impact | M | | INTEGER (0 . . . 4, . . . ) | Measured by Predicted Number Of Occupied PDCCH OFDM Symbols (see TS 36.211 [10]). Value 0 means "no prediction is available". | — | — |
| RNTP Per PRB per subframe | O | | BIT STRING (6 . . . 4400, . . . ) | Each position in the bitmap represents a PRB in a subframe, for which value "1" indicates 'resource with no utilization constraints' and value "0" indicates 'interference protected resource.' The first bit corresponds to PRB 0 of the first subframe for which the RNTP per PRB per subframe IE is valid, the second bit corresponds to PRB 1 of the first subframe for which the RNTP per PRB per subframe IE is valid, and so on. The length of the bit string is an integer (maximum 40) multiple of $N_{RB}^{DL}$. $N_{RB}^{DL}$ is defined in TS 36.211 [10]. The bit string may span across multiple contiguous subframes. The pattern across contiguous subframes formed by RNTP per PRB per subframe IE is continuously repeated. | | |

TABLE D10-continued

| IE/Group Name | Presence | Range | IE type and reference | Semantics description | Criticality | Assigned Criticality |
|---|---|---|---|---|---|---|
| RNTP per PRB per subframe start time | | 0 ... 1 | | | | |
| >Starting SFN | M | | INTEGER (0 ... 1023, ... ) | SFN of the radio frame containing the first subframe when the RNTP Per PRB Per Subframe IE is valid. | | |
| >Starting Subframe Index | M | | INTEGER (0 ... 9, ... ) | Subframe number, within the radio frame indicated by the Start SFN IE, of the first subframe when the RNTP Per PRB Per Subframe IE is valid. | | |

Another alternative using multiple thresholds conveyed via 2 bits is given below.

TABLE D11

| IE/Group Name | Presence | Range | IE type and reference | Semantics description | Criticality | Assigned Criticality |
|---|---|---|---|---|---|---|
| ERNTP Per PRB and subframe | M | | BIT STRING (12 ... 220, ...) | Each position in the bitmap represents a PRB in a subframe, for which the value "xx" indicates how the transmission power in a resource block is mapped relative to the two power thresholds:<br>00 - power level not exceeding the LPTH<br>01 - power level between LPTH and MPTH;<br>10 - power level between MPTH and HPTH;<br>11 - no promise on the Tx power is given.<br>The first 2 bits correspond to PRB 0 of the first subframe for which the IE is valid, the following 2 bits correspond to PRB 1 of the first subframe for which the IE is valid, and so on.<br>The bit string may span across multiple contiguous | — | — |

TABLE D11-continued

| IE/Group Name | Presence | Range | IE type and reference | Semantics description | Criticality | Assigned Criticality |
|---|---|---|---|---|---|---|
| | | | | subframes. The length of the bit string is an integer (maximum 40) multiple of. The parameter is defined in TS 36.211 [10]. The ERNTP pattern is continuously repeated with a periodicity indicated in Periodicity. | | |
| Transmitted power levels | | | | | | |
| LPTH (Low Power Threshold) | M | | ENUMERATED ($-\infty$, $-11$, $-10$, $-9$, $-8$, $-7$, $-6$, $-5$, $-4$, $-3$, $-2$, $-1$, $0$, $1, 2, 3, \ldots$) | Lower RNTP power threshold, using the $RNTP_{threshold}$ defined in TS 36.213 [11]. | — | — |
| MPTH (Medium Power Threshold) | M | | ENUMERATED ($-\infty$, $-11$, $-10$, $-9$, $-8$, $-7$, $-6$, $-5$, $-4$, $-3$, $-2$, $-1$, $0$, $1, 2, 3, \ldots$) | Medium RNTP power threshold, using the $RNTP_{threshold}$ defined in TS 36.213 [11]. | | |
| HPTH (High Power Threshold) | M | | ENUMERATED ($-\infty$, $-11$, $-10$, $-9$, $-8$, $-7$, $-6$, $-5$, $-4$, $-3$, $-2$, $-1$, $0$, $1, 2, 3, \ldots$) | Higher RNTP power threshold, using the $RNTP_{threshold}$ defined in TS 36.213 [11]. | | |
| Subframe sequence definition | | | | | | |
| >Start SFN | M | | INTEGER (0 . . . 1023) | SFN of the radio frame containing the first subframe where the RNTP Per PRB Per Subframe IE is valid. | | |
| >Start Subframe Number | M | | INTEGER (0 . . . 39) | Subframe number, within the radio frame indicated by the Start SFN IE, of the first subframe when the RNTP Per PRB Per Subframe IE is valid. | | |
| No. of subframes | M | | 1 . . . 40 | No. of subframes for which is defined the bitstream | | |
| Periodicity | | | 1 . . . 40 | The number of subframes after which the bit pattern is repeated | | |

TABLE D11-continued

| IE/Group Name | Presence | Range | IE type and reference | Semantics description | Criticality | Assigned Criticality |
|---|---|---|---|---|---|---|
| Number Of Cell-specific Antenna Ports | M | | ENUMERATED (1, 2, 4, . . .) | P (number of antenna ports for cell-specific reference signals) defined in TS 36.211 [10] | | |
| P_B | M | | INTEGER (0 . . . 3, . . .) | $P_B$ is defined in TS 36.213 [11]. | | |

The point in the table given above is that since the choice '11' already indicates no promise on the power level (which covers the case of transmit power being arbitrarily high) we can use three thresholds (instead of two) since there is no need to convey that the power level is greater than HPTH (as this is subsumed by '11').

However, one problem with indicating multiple thresholds is that the current CoMP hypothesis (implicitly) assumes just one threshold. In this sense there is a mismatch between using multiple thresholds in eRNTP and not in the CoMP hypothesis. Consequently, the full potential of multiple thresholds may not be realized inspire of the additional overhead.

Suppose that there are L subband selection types denoted by $\{(N_1, q_1), \ldots, (N_L, q_L)\}$, where the $l^{th}$ selection type is defined by $N_l, q_l$ which denote the total number of subbands and the number of subbands that must be selected, respectively, under that type. Note that under each selection type the size of each subband is fixed and known a-priori. Further, suppose that there are J bandwidth portions, each portion comprising $S_j$, $1 \leq j \leq J$ subbands. Only one subband is selected from the $S_j$ subbands in each bandwidth portion $j \in \{1, \ldots, J\}$. Further since the user sequentially reports its CSI report for the bandwidth portions, we can impose a nested structure on the corresponding exchange of CSI from sending eNB2 to receiving eNB1. In particular, we impose the structure under which the CSI of any subband in the $j^{th}$ portion is sent only if the CSI of a subband in each of the preceeding j-1 bandwidth portions are sent. This structure enables efficient exchange of CSI without any loss of generality. Thus, overall there are L+J different selection types possible (with the last J types associated with the selections from bandwidth portions). Then, each selection in the total number of distinct subband selections can be identified by a combinatorial index R whose range is given by $$0, \ldots, \sum_{j=1}^{L} \binom{N_j}{q_j} + \left(\sum_{j=1}^{J} \prod_{k=1}^{j} S_k\right) - 1.$$

We next discuss the generation of the index at the sending eNB followed by the determination of the particular selection from the index at the receiving eNB. Towards this end, we define a set of offsets as follows:

$$O_l = O_{l-1} + \binom{N_{l-1}}{q_{l-1}},$$

$l=2, \ldots, L+1$ and $O_1=0$. Further, we set $O_l = O_{l-1} + \Pi_{j=1}^{l-L-1} S_j$, $l=L+2, \ldots, L+J$.

Generation of Index at Sending eNB

At the sending eNB, first identify the selection type l.

If $l \in \{1, \ldots, L\}$ then $q_l$ subbands are selected from $N_l$ total subbands. Let $m_0, \ldots, m_{q_l-1}$ be the selected subband indices that are ordered, i.e., $m_0 < m_1 < \ldots < m_{q_l-1}$ and all lie in $\{1, \ldots, N_l\}$. Set $$R = O_l + \sum_{j=0}^{q_l-1} \binom{N_l - m_j}{q_l - j}.$$

Else $l \in \{L+1, \ldots, L+J\}$. Let $m_1, \ldots, m_{l-L}$ denote the chosen subband indices, one from each of the first l-L bandwidth portions, and where $m_j \in \{1 \ldots, S_j\}$, $j=1, \ldots l-L$. Set $R = O_l + \Pi_{j=1}^{l-L} m_j - 1$.

Retrieving Subband Selection from Index at Receiving eNB

At the receiving eNB, find the greatest l such that $O_l \leq R$.

If $l \in \{1, \ldots, L\}$ then $q_l$ subbands have been selected from $N_l$ total subbands. Let $m_0, \ldots, m_{q_l-1}$ be the ordered subband indices that need to be determined. Initialize a=1, $r = R - O_l$.

For k=0, . . . , $q_l$-1 Do
  b=a, $$Q = \binom{N_l - b}{q_l - k}.$$

While Q>r Do: b=b+1 and $$Q = \binom{N_l - b}{q_l - k}.$$

EndWhile
  $m_k = b$, a=b+1, r=r-Q.

Else $l \in \{L+1, \ldots, L+J\}$. Let $m_1, \ldots, m_{l-L}$ denote the subband indices that need to be determined, one from each of the first l-L bandwidth portions, and where $m_j \in \{1 \ldots, S_j\}$, $j=1, \ldots l-L$. Set $r = R - O_l$, B=l-L and $A = S_1 \times \ldots \times S_B$.

For k=1, . . . , B-1 Do
  $A = A/S_k$, $$\hat{m} = \left\lfloor \frac{r}{A} \right\rfloor$$

and $m_k = \hat{m} + 1$.
  Update $r = r - \hat{m} S_k$
$m_B = r + 1$

Embodiment E

E1 Introduction

We summarize the 3 options for subband definition, and provide enhancements for them, together with an enhancement for eRNTP (enhanced Relative Narrowband Tx Power).

E2 Summary of Solutions

General notes:
All the following options allows eNB to "process" CQI (channel quality indication) values (implementation based manner) before sending over X2.
Some of the main differentiators between the options are:
1) Simplicity, if sending eNB implementation only sends "raw" CSI (Channel State Information)→Option A, C (albeit only with the respective enhancements)
2) Flexibility, if sending eNB implementation processes CSI (e.g. combines or merges overlapping Periodic and Aperiodic reports)→Option B, C
Option A: Subband Index+Report Type

TABLE E1

| >>Subband CQI List | | 0 . . . <maxSubband> | | |
|---|---|---|---|---|
| >>>Subband CQI | M | | 9.2.cc | |
| >>>Subband Index | O | | INTEGER (0 . . . 27, . . . ) | Included in case of UE selected subband CQI reporting. |
| >>> Report Type | O | | ENUMERATED (periodic, aperiodic, . . . ) | Included in case of UE selected subband CQI reporting. |

Notes for Option A:
Primary Motivation: Allows serving eNB to send CSI reports over X2 with as little processing as possible
Description: The subband partitioning is fixed, based on the UE's CSI reporting configuration. The Report Type and Subtend Index IEs are used by the receiving eNB to derive the subband positions and their size and total number of subbands. The latter information is also important since it will enable receiving eNB to determine what the differential CQI conveyed for that subband means. This is because in aperiodic mode 3-0 (or 3-1) and aperiodic mode 2-0 (or 2-2) the same differential value can be mapped to different offsets, respectively. Thus, the only way the receiving eNB1 can deduce the right offset value to use is to utilize the fact that for the given system bandwidth (or given total number of PRBs (physical resource blocks) available at sending eNB2 (which is known or conveyed separately to eNB1)) the number of sub bands for which CQIs are reported is distinct under those two aperiodic modes, respectively. Another alternative is to convey the exact configured feedback mode (such as aperiodic 3-1 etc) under the Report type IE (information element).
Allows sending "raw" CQI over X2, in a format similar to what is received from the UE (i.e. Subband Index)
Allows sending both Periodic and Aperiodic reports in the same X2 message; in case of overlapping Aperiodic and Periodic CSI reports, the handling is left to receiving eNB implementation (e.g. merge, discard, etc). We note that sending two reports in the same message is beneficial since otherwise several reports may need to be dropped by the sending eNB in order to comply with the one report per X2 message constraint and the periodicity configured for the X2 messages.

However, a problem in sending both aperiodic and periodic subband reports together in the same X2 message as per the aforementioned structure, is that the associated reference wideband reports that are used to compute them can be different. In particular, the wideband rank indicators (RIs) that are determined by the UE under the configured aperiodic mode and the configured periodic mode can be different. Similarly, the wideband CQIs determined by the UE under the configured periodic mode and the configured aperiodic mode can be different. Furthermore, each subband CQI determined under the aperiodic mode is reported by the UE (over PUSCH (physical uplink shared channel)) as a differential value with respect to the corresponding wideband CQI. For example, suppose aperiodic feedback mode 2-2 and periodic feedback mode 2-1 are configured. Then, under the aperiodic mode 2-2 the UE will report one wideband CQI (per codeword) as well as one subband CQI (per codeword) for the selected best-M feedback as a differential value (using 2 bits) with respect to the wideband CQI corresponding to that codeword. On the other hand, under the periodic 2-1 mode the UE will report (over PUCCH (physical uplink control channel)) one wideband CQI (per codeword), with the wideband CQI of the second codeword being reported as a differential value with respect to the wideband CQI of the first one. In addition the UE will report one subband CQI for the first codeword and the second CQI as a differential value with respect to the subband CQI of the first one.

Therefore it becomes clear that we need to have separate sets of RIs and wideband CQIs in the X2 message whenever that message contains both aperiodic and periodic subband reports. If such separate sets of wideband components are not included then the receiving eNB will use the same wideband RI or CQI(s) for both aperiodic and periodic information. This defeats the purpose of conveying separate aperiodic and periodic subband reports in the same X2 message.

We propose an optimized structure in the following as a remedy to this issue.

TABLE E2

| IE/Group Name | Presence | Range | IE type and reference | Semantics description |
|---|---|---|---|---|
| CSI Report per UE | | 1 . . . <maxUEReport> | | |
| >UE ID | M | | BIT STRING (SIZE(16)) | ID of the UE served by the cell in eNB$_2$. |
| >CSI Report per CSI Process | | 1 . . . <maxCSIProcess> | | |
| >> Report type per CSI process | | 0 . . . 1 | | |

TABLE E2-continued

| | | | | |
|---|---|---|---|---|
| >>>Report Type | M | | ENUMERATED (periodic, aperiodic, . . . ) | |
| >>>RI | M | | INTEGER (1 . . . 8, . . . ) | Defined in TS 36.213 [11]. |
| >>>Wideband CQI | M | | 9.2.bb | |
| >>>Subband CQI List | | 0 . . . <maxSubband> | | |
| >>>>Subband CQI | M | | 9.2.cc | |
| >>>>Subband Index | | | INTEGER (0 . . . 27, . . . ) | Included in the case of UE selected subband CQI reporting. |

| Range bound | Explanation |
|---|---|
| maxUEReport | Maximum number of UE measurement reports. Value is 128. |
| maxCSIProcess | Maximum number of CSI processes. The value is 4. |
| maxSubband | Maximum number of subbands. The value can be 14 or 15 or 16 or 17 or 18 or 28 |

The value of 15 for the maxSubband is computed as 14+1, where 14 is the number of subbands in an aperiodic mode 3-0 or 3-1 assuming 110 DL (downlink) RBs (resource blocks) and 1 other subband is for periodic mode 2-0 or 2-1 assuming subband report for one bandwidth portion is allowed in the X2 message. Similarly, values 16, 17, 18 are computed assuming subband report for 2, 3, 4 bandwidth portions, respectively, are allowed in the same X2 message.

The same problem identified above can also arise when the sending eNB sends two different reports (corresponding to a configured periodic mode or corresponding to a configured aperiodic mode). The presented optimized structure addresses even such cases since it allows for two reporting types per CSI process of each UE. Each one of those two reporting types can be both periodic or both aperiodic.

In this context, we note that the value of maxSubband equal to 28 arises when we allow for two aperiodic reports, for example 28=14+14, where 14 is the number of subbands in an aperiodic mode 3-0 or 3-1 assuming 110 DL RBs.

Moreover, to provide further flexibility the range of the "Report type per CSI process" can be increased from two to a larger value such as 3 or 4 or 5.

9.2.bb Wideband CQI

This IE indicates the Wideband CQI as defined in TS 36.213.

TABLE E3

| IE/Group Name | Presence | Range | IE Type and Reference | Semantics Description |
|---|---|---|---|---|
| Wideband absolute CQI Codeword 0 | M | | INTEGER (0 . . . 15, . . . ) | Encoded in TS 36.213 [11]. |
| CHOICE Wideband CQI Codeword 1 | O | | | |
| >Wideband absolute CQI Codeword 1 | M | | INTEGER (0 . . . 15, . . . ) | Encoded in TS 36.213 [11]. |
| >Wideband differential CQI Codeword 1 | M | | INTEGER (0 . . . 7, . . . ) | Encoded in TS 36.213 [11]. |

9.2.cc Subband CQI

This IE indicates the Subband CQI as defined in TS 36.213.

TABLE E4

| IE/Group Name | Presence | Range | IE Type and Reference | Semantics Description |
|---|---|---|---|---|
| CHOICE Subband CQI Codeword 0 | M | | | |
| >Subband absolute CQI Codeword 0 | M | | INTEGER (0 . . . 15, . . . ) | Encoded in TS 36.213 [11]. |
| >Subband differential CQI Codeword 0 | M | | INTEGER (0 . . . 3, . . . ) | Encoded in TS 36.213 [11]. |
| CHOICE Subband CQI Codeword 1 | O | | | |
| >Subband absolute CQI Codeword 1 | M | | INTEGER (0 . . . 15, . . . ) | Encoded in TS 36.213 [11]. |
| >Subband differential CQI Codeword 1 | M | | INTEGER (0 . . . 7, . . . ) | Encoded in TS 36.213 [11]. |
| >Subband differential CQI Codeword 1 | M | | INTEGER (0 . . . 3, . . . ) | Encoded in TS 36.213 [11]. |

Other equivalent variations of the optimized structure are possible with the common theme being that a separate wideband component (comprising RI and wideband CQI(s)) is conveyed for the aperiodic and the periodic reports, respectively, and where the structure should allow the receiving eNB to unambiguously associate the periodic and aperiodic subband components with their respective wideband counterparts. Notice that under the optimized structure if only one of the aperiodic or periodic subband information is reported in the X2 message, it will include only the corresponding wideband information.

Notice also that under the aperiodic feedback modes (2-0 and 2-1) the UE reports common subband information for all the best-M subbands, thus in the structure presented above the sender eNB will repeat the same subband CQI for all the best-M indicated subbands. This repetition can be avoided by modifying the structure as follows.

The subband CQI IE is made optional with the understanding that if this IE is not present the CQI for that subband is taken to be the same as that of the subband (closest to it in frequency and of the same reporting type) with a lower index for which the CQI has been conveyed in that message, with the restriction that the latter CQI must have been indicated.

Option B: Subband Start+Subband Size

TABLE E5

| >>Subband CQI List | | 0 . . . <maxSubband> | |
|---|---|---|---|
| >>>Subband CQI | M | 9.2.cc | |
| >>>Subband Start | O | INTEGER (2 . . . 109, . . . ) | Corresponds to the PRB number of the first PRB in a subband defined in TS 36.213 [11] for the system bandwidth.If this IE is not present, the subband is contiguous with the previous subband in the list, or starts with PRB 0 if this is the first subband in the list. |
| >>>Subband Size | M | ENUMERATED (2, 3, 4, 6, 8, . . . ) | Corresponds to a value of subband size k defined in TS 36.213 [11] for the system bandwidth. Ignored for the highest frequency subband. |

Notes for Option B:

Primary Motivation: Enables greater implementation flexibility for sending "processed" CQI in alignment with the RAN3 agreement that "the serving eNB can process CSI (implementation)", particularly for the case where UE is configured for both Aperiodic and Periodic CSI reporting Description: The Subband Start and Subband Size IEs are used to explicitly indicate the subbands. The subbands are restricted to those defined for the system bandwidth $N_{RB}^{DL}$.

Allows sending "raw" CQI over X2, but in a different format than used by the UE (i.e. Subband Start)

Allows sending both Periodic and Aperiodic reports in the same X2 message; in case of overlapping Aperiodic and Periodic CSI reports, the sending eNB can process (e.g. merge) according to implementation-specific algorithms We note that in this structure given for option-B since only one set of wideband components are included, the sending eNB must harmonize RIs and wideband CQIs that are received from a periodic and aperiodic reports or two different periodic reports or two different aperiodic reports, respectively. In this context, using absolute value for the subband CQIs is particularly beneficial since then such CQIs can be directly used without matching them to any sideband reference.

As another optimization in this structure the Subband CQI IE can be made optional in which case the CQI for this subband is assumed to be the same as that of the last preceding subband for which a CQI is indicated. The CQI for the first sub band is always indicated. This optimization helps to avoid redundancies that can arise for instance in conveying best-M feedback as described before.

We note that here maximum number of subbands can be 28 (assuming 110 DL RBs and subband size of 4 under aperiodic mode 2-0 or 2-2).

Option C: Subband Index+Subband Size

TABLE E6

| >>Subband CQI List | 0 . . . <maxSubband> | |
|---|---|---|
| >>>Subband M CQI | | 9.2.cc |
| >>>Subband Index | O | INTEGER (0 . . . 27, . . . ) | Included in case of UE selected subband CQI reporting. |
| >>>Subband Size | M | ENUMERATED (2, 3, 4, 6, 8, . . . ) | Corresponds to a value of subband size k defined in TS 36.213 [11] for the system bandwidth. Ignored if the Subband Index corresponds to the highest frequency subband. |

Notes for Option C:

Description: The Subband Size IE is used by sending eNB to explicitly indicate the subband partitioning (rather than receiving eNB deriving the subband partitioning based on information about the UE's CSI reporting configuration). The PRB number of the first PRB in the subband is calculated as (Subband Index×Subband Size).

Allows sending "raw" CQI over X2, in a format similar to what is received from the UE (i.e. Subband Index)

Allows sending both Periodic and Aperiodic reports in the same X2 message; in case of overlapping Aperiodic and Periodic CSI reports, the sending eNB can process (e.g. merge) according to implementation-specific algorithms If overlapping Aperiodic and Periodic CSI reports are received, then sending eNB can (as implementation option) "split" the Periodic subband into two Aperiodic subbands over X2. Assumption is that, according to subband definitions in TS 36.213, a Periodic subband is always composed of two Aperiodic subbands.

Example $N_{RB}^{DL}$ is 50, and eNB receives two CSI reports over Uu during a given interval: Aperiodic Mode 2-* for subband index 1 (subband size 3) and Periodic Mode 2-* for subband index 0 (subband size 6). Then, eNB has several options for sending the information over X2:

a) Send both reports over X2 and let receiving eNB decide how to handle b) Select one of the two reports to send over X2 (e.g. the latest report)

c) Merge the Aperiodic and Periodic reports into two Aperiodic reports over X2 (subband index 0 and 1)

The observation made in option-A regarding the need to send separate wideband components in case both aperiodic and periodic reports are sent on the same X2 message also holds in this case.

Thus, we need to modify option-C as the following:

Other equivalent variations of the optimized structure are possible with the common theme being that a separate wideband component (comprising RI and wideband CQI(s)) is conveyed as a reference for the aperiodic and the periodic subband reports, respectively, and where the structure should allow the receiving eNB to unambiguously associate the periodic and aperiodic subband components with their respective wideband counterparts. Notice that under the optimized structure if only one of the aperiodic or periodic subband information is reported in the X2 message, it will include only the corresponding wideband information. Further, in case the structure includes merged CSI (where the merging or processing is done by the sender) then only one wideband component will be included and in this case all the subband CQIs will be conveyed as absolute CQIs (using 4 bits or 16 possibilities).

In this option the sending eNB must ensure that it uses the right number of subbands in its message when conveying the aperiodic CSI information. As described for option-A, doing so is important since it will enable receiving eNB to determine what the differential CQI conveyed for that subband means. This is because in aperiodic mode 3-0 (or 3-1) and aperiodic mode 2-0 (or 2-2) the same differential value can be mapped to different offsets, respectively. Thus, the only way the receiving eNB1 can deduce the right offset value to use is to utilize the fact that for the given system bandwidth (or given total number of PRBs available at sending eNB2 (which is known or conveyed separately to eNB1)) the number of sub bands for which CQIs are reported is distinct under those two aperiodic modes, respectively.

TABLE E7

| IE/Group Name | Presence | Range | IE type and reference | Semantics description |
|---|---|---|---|---|
| CSI Report per UE | | 1 . . . <maxUEReport> | | |
| >UE ID | M | | BIT STRING (SIZE(16)) | ID of the UE served by the cell in eNB$_2$. |
| >CSI Report per CSI Process | | 1 . . . <maxCSIProcess> | | |
| >> Refence type per CSI process | | 0 . . . 1 | | |
| >>>Reference Type | M | | ENUMERATED (periodic, aperiodic, . . . ) | |
| >>>RI | M | | INTEGER (1 . . . 8, . . . ) | Defined in TS 36.213 [11]. |
| >>>Wideband CQI | M | | 9.2.bb | |
| >>Subband CQI List | | 0 . . . <maxSubband> | | |
| >>>Subband CQI | M | | 9.2.cc | |
| >>>Subband Index | O | | INTEGER (0 . . . 27, . . . ) | Included in case of UE selected subband CQI reporting. |
| >>>Subband Size | M | | ENUMERATED (2, 3, 4, 6, 8, . . . ) | Corresponds to a value of subband size k defined in TS 36.213 [11] for the system bandwidth. Ignored if the Subband Index corresponds to the highest frequency subband. |

Option C': Subband Index+Subband Size

TABLE E8

| | | | | |
|---|---|---|---|---|
| >>Subband Size | M | | ENUMERATED (2, 3, 4, 6, 8, . . . ) | Corresponds to a value of subband size k defined in TS 36.213 [11] for the system bandwidth. |
| >>Subband CQI List | | 0 . . . <maxSubband> | | |
| >>>Subband CQI | M | | 9.2.cc | |
| >>>Subband Index | O | | INTEGER (0 . . . 27, . . . ) | Included in case of UE selected subband CQI reporting. |

Notes for Option C':

Description: Like Option C, but the Subband Size is fixed for all subbands. Here maximum number of subbands can be 28 (assuming 110 DL RBs and subband size of 4 under aperiodic mode 2-0 or 2-2).

eRNTP Enhancements.

We provide an eRNTP version which allows the sender eNB to seamlessly convey either explicitly convey the applied power level (relative to one or more specified thresholds) or to convey whether a resource will be interference protected or not. We note that a resource can be interference protected by multiple methods which include lower power or by using an appropriate beam forming vector etc.

TABLE E9

| IE/Group Name | Presence | Range | IE type and reference | Semantics description | Criticality | Assigned Criticality |
|---|---|---|---|---|---|---|
| RNTP per PRB | M | | BIT STRING (6 . . . 110, . . .) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given". This IE is ignored if the Enhanced RNTP IE is present. | — | — |
| RNTP Threshold | O | | ENUMERATED (−∞, −11, −10, −9, −8, −7, −6, −5, −4, −3, −2, −1, 0, 1, 2, 3, . . .) | $RNTP_{threshold}$ is defined in TS 36.213 [11]. This IE is always present if the Enhanced RNTP IE is not present. | — | — |
| Number Of Cell-specific Antenna Ports | M | | ENUMERATED (1, 2, 4, . . . ) | P (number of antenna ports for cell-specific reference signals) defined in TS 36.211 [10] | — | — |
| P_B | M | | INTEGER (0 . . . 3, . . .) | $P_B$ is defined in TS 36.213 [11]. | — | — |
| PDCCH Interference Impact | M | | INTEGER (0 . . . 4, . . .) | Measured by Predicted Number Of Occupied PDCCH OFDM Symbols (see TS 36.211 [10]). Value 0 means "no prediction is available". | — | — |
| Enhanced RNTP IE | O | | BIT STRING (6 . . . 4400, . . .) | Each position in the bitmap represents a PRB in a subframe. If the RNTP Threshold IE is present then the value "1" | | |

TABLE E9-continued

| IE/Group Name | Presence | Range | IE type and reference | Semantics description | Criticality | Assigned Criticality |
|---|---|---|---|---|---|---|
| | | | | indicates 'no promise on the Tx power is given' and value "0" indicates 'Tx not exceeding RNTP threshold.' If the RNTP Threshold IE is not present then value "1" indicates 'resource with no utilization constraints' and value "0" indicates 'interference protected resource.' The first bit corresponds to PRB 0 of the first subframe for which the Enhanced RNTP IE is valid, the second bit corresponds to PRB 1 of the first subframe for which the Enhanced RNTP IE is valid, and so on. The length of the bit string is an integer (maximum 40) multiple of $N_{RB}^{DL}$. $N_{RB}^{DL}$ is defined in TS 36.211 [10]. The bit string may span across multiple contiguous subframes. The pattern across contiguous subframes formed by Enhanced RNTP IE is continuously repeated. | | |
| Enhanced RNTP IE start time | | 0 ... 1 | | | | |
| >Starting SFN | M | | INTEGER (0 ... 1023, ...) | SFN of the radio frame containing the first subframe when the Enhanced RNTP IE is valid. | | |
| >Starting Subframe Index | M | | INTEGER (0 ... 9, ...) | Subframe number, within the radio frame indicated by the Start SFN IE, of the first subframe when the Enhanced RNTP IE is valid. | | |

Embodiment F

F1. Introduction

In this document we discuss some issues with subband indexing schemes and then present our preference in a proposal.

F2. Discussion

F2.1 Conveying Both Periodic and Aperiodic Reports

A desirable feature that should be supported by a CSI signaling scheme is the exchange of both periodic and aperiodic CSI reports in the same X2 message, possibly in a combined (or merged) form. In the absence of this feature, i.e., when the sending eNB is forced to choose either the periodic or the aperiodic CSI report obtained under a CSI process of some user, the sending eNB will have to drop available CSI reports. This would be unfortunate given that precious over-the-air signaling resources have already been spent in acquiring these reports and these reports can together convey more CSI that either individual one.

Then, a problem that needs to be overcome in order to send both aperiodic and periodic subband reports together in the same X2 message, is described next. In particular, the associated reference wideband reports that are used to compute the constituent subband parts of the aperiodic and periodic CSI reports, respectively, can be different. Indeed, the wideband rank indicators (RIs) that are determined by the UE under the configured aperiodic mode and the configured periodic mode can be different. Similarly, the wideband CQIs determined by the UE under the configured periodic mode and the configured aperiodic mode are also more likely to be different. Furthermore, each subband CQI determined by the UE under the configured mode can be reported by it as a differential value with respect to a corresponding reference CQI. For example, suppose aperiodic feedback mode 2-2 and periodic feedback mode 2-1 are configured. Then, under the aperiodic mode 2-2 the UE will report (over PUSCH) one wideband CQI (per codeword) as well as one subband CQI (per codeword) for the selected best-M feedback as a differential value (using 2 bits) with respect to the wideband CQI corresponding to that codeword. On the other hand, under the periodic 2-1 mode the UE will report (over PUCCH) one wideband CQI (per codeword), with the wideband CQI of the second codeword being reported as a differential value with respect to the wideband CQI of the first one. In addition the UE will report one subband CQI for the first codeword and the second codeword subband CQI as a differential value with respect to the subband CQI of the first one.

Therefore it becomes clear that we have to alternatives to overcome this issue:

Alternative-1: Provision to include two separate sets of RIs and wideband CQIs in the X2 message whenever that message contains both aperiodic and periodic subband reports. This will allow simple forwarding of both aperiodic and periodic reports in the same X2 message. In this context, we note that a structure which does not provide for including two separate sets of wideband components, forces the sending eNB to merge the wideband components and use a common reference for both aperiodic and periodic subband reports. This defeats the purpose of conveying separate aperiodic and periodic subband reports in the same X2 message. Another issue in including the report type IE (specifying periodic or aperiodic report) within the list of subbands, is that ambiguity can be introduced when certain aperiodic and periodic reports are combined.

Alternative-2: Always merge separate sets of wideband components into one wideband component that will also be used as a common reference. In this case it is logical to merge the respective subband information as well, and upon doing so there is no need to indicate the type of the subband CSI report. However, this view prevents simple forwarding of both aperiodic and periodic reports in the same X2 message.

In order to obtain the merits of both the aforementioned alternatives, we propose a simple structure. This structure is presented in three versions, with the second and third ones being more bit-efficient version of the first.

The benefits of this proposal are as follows:

It allows for simple forwarding of both aperiodic and periodic reports in the same X2 message. In fact it allows for forwarding of multiple aggregated aperiodic or periodic CSI reports (from a UE under a CSI process) or their combinations in the same X2 message.

The parameter $N_{RB}^{DL}$ together with the conveyed subband size IE defines the subband partition, which corresponds to one of those defined in TS36.213.

It also allows for merging an aperiodic and a periodic report (or merging combinations of multiple periodic and/or multiple aperiodic CSI reports) without introducing any new subband definitions. This is because for a given total number of RBs (or PRBs), $N_{RB}^{DL}$, the subband size in aperiodic mode 2-* is exactly half of that of the aperiodic mode 3-* as well as periodic mode 2-*. Thus, in order to combine such reports we can use the subbands defined by the smaller subband size and convey (possibly processed) CQIs for them.

Other implementation based processing of the short-term CSI is also supported.

The first version is relatively straightforward. Two of its features are however worth pointing out:

For each CSI process we can convey up-to maxReferenceType reports. The Reference Type IE can be ENUMERATED for instance as periodic or aperiodic. Alternatively, the Reference Type IE can simply be dropped.

The subband CQIs are conveyed sequentially in the increasing order of subband indices. Then, in case the subband CQI IE for a subband is not conveyed, the receiving eNB must use the CQI conveyed for the last preceding subband. The CQI for the first subband must always be included. This feature can significantly save overhead by avoiding redundancy. Note that when a UE is configured in the aperiodic mode 2-*, it selects and reports indices for M out of N subbands. However, only one CQI (per codeword) is reported by it for all the M selected subbands. Therefore, it is beneficial that redundancy is avoided in reporting such CQIs.

The Subband Index IE is optional. In case this IE is not included then the subband CQI information for each one of the total number of subbands is conveyed. Recall that the parameter $N_{RB}^{DL}$ together with the conveyed subband size IE defines the subband partition, thereby conveying the total number of subbands N.

We now consider a more bit efficient second version in which the sub band selection is conveyed by means of a combinatorial index.

Here, under each Reference Type IE, the parameter $N_{RB}^{DL}$ together with the conveyed subband size IE defines the subband partition, thereby conveying the total number of subbands N. Also the number of subbands for which subband CQI is conveyed, M, is determined by the size of the Subband CQI List IE.

The combinatorial index, r, is defined based on TS36.213 (section 7.2.1) as follows:

The positions of the M selected subbands is conveyed using a combinatorial index r defined as $$r = \sum_{i=0}^{M-1} \binom{N - s_i}{M - i}$$

where N denotes the total number of subbands and the set $\{s_i\}_{i=0}^{M-1}$, ($1 \le s_i \le N$, $s_i < s_{i+1}$) contains the M sorted subband indices and $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N}{M} - 1\right\}.$$

To illustrate, consider first the case when $N_{RB}^{DL}=110$ and the Reference Type IE is set to be aperiodic. Then, we have two possibilities for subband selection. The first one is when the configured mode is 2-* in which case the subband size is 4 so that N=28 and here M=6. On the other hand, for aperiodic mode 3-* the subband size is 8 so that N=14 and here M=14. Similar argument applies to all other modes as well. It is also apparent that there is significant flexibility in aggregating several different reports under a Reference Type, as long as the subband partition is a valid one, i.e., corresponds to a one defined in TS36.213. Since the maximum value of N=28 (when $N_{RB}^{DL}=110$ and subband size is 4) we represent the combinatorial index using a bit string of length 26. This allows us to convey any possible selection choice of subbands from the maximum of 28 subbands.

Next, we consider the third version in which the sub band selection is again conveyed by means of a combinatorial index. This version can be somewhat more restrictive compared to the second version but can also be more bit efficient. Here, the number of selected subbands and their size, in addition to their positions or indices, are also indicated by the combinatorial index.

Consider first the case when the Report Type IE is set to be aperiodic. Then, we have two possibilities for subband selection. The first one is when the configured mode is 2-* in which case the combinatorial index, r, is defined based on TS36.213 (section 7.2.1) as follows:

The positions of the M UE selected subbands is conveyed using a combinatorial index r defined as $$r = \sum_{i=0}^{M-1} \binom{N - s_i}{M - i}$$

where N denotes the number of subbands and the set $\{s_i\}_{i=0}^{M-1}$, ($1 \le s_i \le N$, $s_i < s_{i+1}$) contains the M sorted subband indices and $$\binom{x}{y} = \begin{cases} \binom{x}{y} & x \ge y \\ 0 & x < y \end{cases}$$

is the extended binomial coefficient, resulting in unique label $$r \in \left\{0, \ldots, \binom{N}{M} - 1\right\}.$$

One additional possibility must be included to cover the case when the configured mode is 3-* in which case CQIs for all subbands have to be conveyed. We can choose r=−1 for this purpose. Then, notice that the combinatorial index, r, along with the parameter, $N_{RB}^{DL}$, together convey the total number of subbands, N, and the number of selected subbands, M, as well as the size of each subband and their positions or indices.

Consider next the case when the Report Type IE is set to be periodic. We consider the mode 2-* that is the only mode under which the subband information is reported. Here the user reports CSI for one selected subband from each one of the J bandwidth parts (or portions) sequentially over successive reporting instances. Therefore, depending on the periodicities configured for the X2 CSI exchange and the over-the-air reports, the sending eNB can have subband reports for up-to J subbands. Notice that since the user must report the information for each subband sequentially, no bandwidth part indicator is defined in TS36.213. We adopt the same approach and enforce that the subband CSI for all available bandwidth parts must be reported in the same X2 message. This nested structure will make the X2 message self-contained and avoid the need for a separate bandwidth part indicator.

Accordingly, letting N1, N2, . . . , NJ, denote the number of subbands in each of the J bandwidth parts, the combinatorial index must cover for N1 possibilities for the subband selection from the first bandwidth part, N1*N2 possibilities for the subband selections together from the first and second bandwidth parts, and so on till N1*N2* . . . NJ possibilities for the subband selections together from all the J bandwidth parts.

F3. Conclusion

We discussed the necessary X2 message to support CSI exchange for inter-eNB CoMP and presented our views on subband indexing along with corresponding proposals.

9.1.2.14 Resource Status Update

This message is sent by $eNB_2$ to neighbouring $eNB_1$ to report the results of the requested measurements.

Direction: $eNB_2 \rightarrow eNB_1$.

9.2.aa UE-CSI Report (Version-1)

This IE provides UE-CSI information for a set of UEs served by $eNB_2$.

TABLE F1

| IE/Group Name | Presence | Range | IE type and reference | Semantics description |
|---|---|---|---|---|
| CSI Report per UE | | 1 . . .<br><maxUEReport> | | |
| >UE ID | M | | BIT STRING (SIZE(16)) | ID of the UE served by the cell in eNB$_2$. |
| >CSI Report per CSI Process | | 1 . . .<br><maxCSIProcess> | | |
| >> UE-CSI process Configuration index | M | FFS | FFS | CSI process configuration information. |
| >> Reference type per CSI process | | 1 . . .<br><maxReferenceTypes> | | |
| >>>Reference Type | M | | ENUMERATED | |
| >>>RI | M | | INTEGER (1 . . . 8, . . . ) | Defined in TS 36.213 [11]. |
| >>>Wideband CQI | M | | 9.2.bb | |
| >>> Subband Size | M | | ENUMERATED (2, 3, 4, 6, 8, . . . ) | Corresponds to a value of subband size k defined in TS 36.213 [11] for the system bandwidth. Ignored if the Subband Index corresponds to the highest frequency subband. |
| >>>Subband CQI List | | 1 . . .<br><maxSubband> | | |
| >>>>Subband CQI | O | | 9.2.cc | If this IE is not present, the CQI is identical to the one provided for the last preceding subband. This IE is always present for the first subband in the list. |
| >>>>Subband Index | O | | INTEGER (0 . . . 27, . . . ) | |

| Range bound | Explanation |
|---|---|
| maxUEReport | Maximum number of UE measurement reports. Value is 128. |
| maxCSIProcess | Maximum number of CSI processes. The value is 4. |
| maxReferenceTypes | Maximum types of of CSI reports. The value is 2. |
| maxSubband | Maximum number of subbands. The value is 28 |

Alternatively, the value of maxReferenceTypes can be 3 or 4.

UE-CSI Report (Version-2)

TABLE F2

| IE/Group Name | Presence | Range | IE type and reference | Semantics description |
|---|---|---|---|---|
| CSI Report per UE | | 1 . . .<br><maxUEReport> | | |
| >UE ID | M | | BIT STRING (SIZE(16)) | ID of the UE served by the cell in eNB$_2$. |
| >CSI Report per CSI Process | | 1 . . .<br><maxCSIProcess> | | |
| >> UE-CSI process Configuration index | M | FFS | FFS | CSI process configuration information. |
| >> Reference type per CSI process | | 1 . . .<br><maxReferenceTypes> | | |
| >>>Reference Type | M | | ENUMERATED | |
| >>>RI | M | | INTEGER (1 . . . 8, . . . ) | Defined in TS 36.213 [11]. |

TABLE F2-continued

| | | | | |
|---|---|---|---|---|
| >>>Wideband CQI | M | | 9.2.bb | |
| >>> Subband Size | M | | ENUMERATED (2, 3, 4, 6, 8, . . . ) | Corresponds to a value of subband size k defined in TS 36.213 [11] for the system bandwidth. Ignored if the Subband Index corresponds to the highest frequency subband. |
| >>> combinatorial index | M | | BITSTRING (SIZE(26)) | As defined in TS36.213 (section 7.2.1). The indices of the subbands in the list are indicated by this combinatorial index. Subband CQIs are sorted in the order of increasing frequency (increasing subband indices). |
| >>>Subband CQI List | | 1 . . . <maxSubband> | | |
| >>>>Subband CQI | 0 | | 9.2.cc | If this IE is not present, the CQI is identical to the one provided for the last preceding subband. This IE is always present for the first subband in the list. |

| Range bound | Explanation |
|---|---|
| maxUEReport | Maximum number of UE measurement reports. Value is 128. |
| maxCSIProcess | Maximum number of CSI processes. The value is 4. |
| maxReferenceTypes | Maximum types of of CSI reports. The value is 2. |
| maxSubband | Maximum number of subbands. The value is 28 |

Version-3:

TABLE F3

| IE/Group Name | Presence | Range | IE type and reference | Semantics description |
|---|---|---|---|---|
| CSI Report per UE | | 1 . . . <maxUEReport> | | |
| >UE ID | M | | BIT STRING (SIZE(16)) | ID of the UE served by the cell in $eNB_2$. |
| >CSI Report per CSI Process | | 1 . . . <maxCSIProcess> | | |
| >>UE-CSI process Configuration index | M | FFS | FFS | CSI process configuration information. |
| >> Reference type per CSI process | | 1 . . . <maxReferenceTypes> | | |
| >>>Reference Type | M | | ENUMERATED | |
| >>>RI | M | | INTEGER (1 . . . 8, . . . ) | Defined in TS 36.213 [11]. |
| >>>Wideband CQI | M | | 9.2.bb | |
| >>> combinatorial index | M | | | As defined in TS36.213 (section 7.2.1). The number of subbands in the |

TABLE F3-continued

| | | | list, their indices, as well their size, are indicated by this combinatorial index. Subband CQIs are sorted in the order of increasing frequency (increasing subband indices). |
|---|---|---|---|
| >>>Subband CQI List | 1 ... <maxSubband> | | |
| >>>>Subband CQI | O | 9.2.cc | If this IE is not present, the CQI is identical to the one provided for the last preceding subband. This IE is always present for the first subband in the list. |

| Range bound | Explanation |
|---|---|
| maxUEReport | Maximum number of UE measurement reports. Value is 128. |
| maxCSIProcess | Maximum number of CSI processes. The value is 4. |
| maxReferenceTypes | Maximum types of of CSI reports. The value is 2. |
| maxSubband | Maximum number of subbands. The value is 28 |

Embodiment G

G1. Introduction

In order to meet the objectives of the Inter eNB CoMP WI it was agreed to extend the RNTP IE to include transmission power level indication per time frequency resources spanning across multiple subframes.

In the following, we provide our views on content of this message, as well as proposals.

G2. Discussion

G2.1 eRNTP Exchange

One concern that was raised during the discussions in RAN3#87bis was on the semantic description of the enhanced RNTP IE whether it is suitable to use the phrase "TX power not exceeding a threshold". This is because certain implementations can achieve "interference protection" via other means such as beam-forming or beam-steering. We believe that even for such implementations, there is a notion of a threshold on effective radiated power from which the receiving eNB can deduce if a resource would be interference protected or not. We note that effective radiated power is a commonly used metric (terminology) which captures the effect of several relevant parameters such as transmit power, antenna gain, directivity, etc. Consequently, it is suitable to have an explicit threshold associated with the enhanced RNTP which indicates the "action" by the sender. We note that it is possible for sender eNB to send different eRNTP messages to different receiving eNBs to convey the potentially different net impacts of its adopted beam patterns and transmit powers on those receiving eNBs.

Accordingly, our preference is to retain the baseline agreement from the last meeting with a modification in the semantic description to use the phrase "Effective radiated TX power" instead of "TX power". This will also accommodate newer implementations that rely on spatial/antenna domain processing to achieve interference mitigation.

We present two proposals. The first one is a more bit-efficient version of the BL agreement (albeit including the aforementioned modified semantic description). It exploits that fact an RNTP IE indicating transmit power levels for the first subframe (subframe #0) must always conveyed. Then, instead of ignoring this IE in the case when the enhanced RNTP IE is included, we can still use it to convey the per-PRB power level information for the first subframe. Moreover, instead of providing per-PRB power level information for each subsequent subframe in the enhanced RNTP IE, we can optionally adopt a more efficient representation in which such information for a subframe is conveyed only if it differs from that of the preceding one.

The second proposal is based on multiple thresholds, where we note that certain implementation can extract gains from such finer power level indication. The point here is that since the choice '11' already indicates no promise on the effective radiated transmit power level (which covers the case of transmit power being arbitrarily high) we can use three thresholds (instead of two), since there is no need to convey that the power level is greater than HPTH (as this is subsumed by '11').

G3. Conclusion

We discussed the necessary X2 message to support eRNTP exchange for inter-eNB CoMP and presented corresponding proposals.
Proposal:
9.2.19 Relative Narrowband Tx Power (RNTP)
This IE provides an indication on DL power restriction per PRB in a cell and other information needed by a neighbour eNB for interference aware scheduling.

TABLE G1

| IE/Group Name | Presence | Range | IE type and reference | Semantics description |
|---|---|---|---|---|
| RNTP Per PRB | M | | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Effective radiated Tx power not exceeding RNTP threshold". Value 1 indicates "no promise on the Effective radiated Tx power is given". This IE is used to indicate DL power restriction per PRB for the first subframe. |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in TS 36.213 [11]. |
| Number Of Cell-specific Antenna Ports | M | | ENUMERATED (1, 2, 4, ...) | P (number of antenna ports for cell-specific reference signals) defined in TS 36.211 [10] |
| P_B | M | | INTEGER (0 ... 3, ...) | $P_B$ is defined in TS 36.213 [11]. |
| PDCCH Interference Impact | M | | INTEGER (0 ... 4, ...) | Measured by Predicted Number Of Occupied PDCCH OFDM Symbols (see TS 36.211 [10]). Value 0 means "no prediction is available". |
| Enhanced RNTP | O | | BIT STRING (6 ... 4290, ...) | Each position in the bitmap represents a PRB in a subframe, for which value "1" indicates 'no promise on the Effective radiated Tx power is given' and value "0" indicates Effective radiated Tx power not exceeding RNTP threshold.' The first bit corresponds to PRB 0 of the first subframe for which the IE is valid, the second bit corresponds to PRB 1 of the first subframe for which the IE is valid, and so on. The length of the bit string is an integer (maximum 39) multiple of $N_{RB}^{DL}$ which is defined in TS 36.211 [10]. The bit string may span across multiple contiguous subframes. The pattern across contiguous subframes (formed by RNTP IE and Enhanced RNTP IE) is continuously repeated |

TABLE G2

| IE/Group Name | Presence | Range | IE type and reference | Semantics description | Criticality | Assigned Criticality |
|---|---|---|---|---|---|---|
| RNTP Per PRB | M | | BIT STRING (6 ... 110, ...) | Each position in the bitmap represents a $n_{PRB}$ value (i.e. first bit = PRB 0 and so on), for which | — | — |

TABLE G2-continued

| IE/Group Name | Presence | Range | IE type and reference | Semantics description | Criticality | Assigned Criticality |
|---|---|---|---|---|---|---|
| | | | | the bit value represents RNTP ($n_{PRB}$), defined in TS 36.213 [11]. Value 0 indicates "Effective radiated Tx power not exceeding RNTP threshold". Value 1 indicates "no promise on the Effective radiated Tx power is given". This IE is ignored when the enhanced RNTP IE is included. | | |
| RNTP Threshold | M | | ENUMERATED (−∞, −11, −10, −9, −8, −7, −6, −5, −4, −3, −2, −1, 0, 1, 2, 3, . . .) | $RNTP_{threshold}$ is defined in TS 36.213 [11]. This IE is ignored when the enhanced RNTP IE is included. | — | — |
| Number Of Cell-specific Antenna Ports | M | | ENUMERATED (1, 2, 4, . . .) | P (number of antenna ports for cell-specific reference signals) defined in TS 36.211 [10] | — | — |
| PDCCH Interference Impact | M | | INTEGER (0 . . . 4, . . .) | Measured by Predicted Number Of Occupied PDCCH OFDM Symbols (see TS 36.211 [10]). Value 0 means "no prediction is available". | — | — |
| Enhanced RNTP | O | | BIT STRING (12, . . . 8800, . . .) | Each position in the bitmap represents a PRB in a subframe, for which the value "xx" indicates how the Effective radiated transmission power in a resource block is mapped relative to the three power thresholds:<br>00 - Effective radiated TX power level not exceeding the LPTH<br>01 - Effective radiated TX power level between LPTH and MPTH;<br>10 - Effective | — | — |

TABLE G2-continued

| IE/Group Name | Presence | Range | IE type and reference | Semantics description | Criticality | Assigned Criticality |
|---|---|---|---|---|---|---|
| | | | | radiated TX power level between MPTH and HPTH: 11 - no promise on the Effective radiated TX power is given. The first 2 bits correspond to PRB 0 of the first subframe for which the IE is valid, the following 2 bits correspond to PRB 1 of the first subframe for which the IE is valid, and so on. The bit string may span across multiple contiguous subframes. The length of the bit string is an integer (maximum 40) multiple of, $N_{RB}^{DL}$ which is defined in TS 36.211 [10]. The Enhanced RNTP pattern is continuously repeated | | |
| > Enhanced RNTP thresholds | | | | | | |
| >>LPTH (Low Power Threshold) | M | | ENUMERATED ($-\infty$, $-11$, $-10$, $-9$, $-8$, $-7$, $-6$, $-5$, $-4$, $-3$, $-2$, $-1$, $0$, $1$, $2$, $3$, . . .) | Lower RNTP power threshold, using the $\text{RNTP}_{threshold}$ defined in TS 36.213 [11]. | — | — |
| >>MPTH (Medium Power Threshold) | M | | ENUMERATED ($-\infty$, $-11$, $-10$, $-9$, $-8$, $-7$, $-6$, $-5$, $-4$, $-3$, $-2$, $-1$, $0$, $1$, $2$, $3$, . . .) | Medium RNTP power threshold, using the $\text{RNTP}_{threshold}$ defined in TS 36.213 [11]. | | |
| >>HPTH (High Power Threshold) | M | | ENUMERATED ($-\infty$, $-11$, $-10$, $-9$, $-8$, $-7$, $-6$, $-5$, $-4$, $-3$, $-2$, $-1$, $0$, $1$, $2$, $3$, . . .) | Higher RNTP power threshold, using the $\text{RNTP}_{threshold}$ defined in TS 36.213 [11]. | | |

Alternative structure for subband indexing:

TABLE G3

| IE/Group Name | Presence | Range | IE type and reference | Semantics description |
|---|---|---|---|---|
| CSI Report per UE | | 1 . . . <maxUEReport> | | |
| >UE ID | M | | BIT STRING (SIZE(16)) | ID of the UE served by the cell in eNB$_2$. |
| >CSI Report per CSI Process | | 1 . . . <maxCSIProcess> | | |
| >> UE-CSI process Configuration index | M | FFS | FFS | CSI process configuration information. |
| >> Reference type per CSI process | | 1 . . . <maxReferenceTypes> | | |
| >>>Reference Type | M | | ENUMERATED | |
| >>>RI | M | | INTEGER (1 . . . 8, . . . ) | Defined in TS 36.213 [11]. |
| >>>Wideband CQI | M | | 9.2.bb | |
| >>>Subband CQI List | | 0 . . . <maxSubband> | | |
| >>>>Subband CQI | O | | 9.2.cc | If this IE is not present, the CQI is identical to the one provided for the last preceding subband. This IE is always present for the first subband in the list. |
| >>>>Subband Start | O | | INTEGER (2 . . . 109, . . . ) | Corresponds to the PRB number of the first PRB in a subband defined in TS 36.213 [11] for the system bandwidth. If this IE is not present, the subband is contiguous with the previous subband in the list, or starts with PRB 0 if this is the first subband in the list. |
| >>>>Subband Size | O | | ENUMERATED (2, 3, 4, 6, 8, . . . ) | Corresponds to a value of subband size k defined in TS 36.213 [11] for the system bandwidth. Ignored for the highest frequency subband. If this IE is not present, the size is identical to the one provided for the last preceding subband. This IE is always present for the first subband in the list. |

Embodiment H

H1. Introduction

In RAN3#88, after fruitful discussions on the exchange of CSI, a subband indexing scheme has been selected in the baseline CR (change request) [4]. In this document we identify some corrections that can be made and present them in a proposal.

H2. Discussion

A desirable feature that should be supported by a CSI signaling scheme is the exchange of both periodic and aperiodic CSI reports in the same X2 message. In the absence of this feature, i.e., when the sending eNB is forced to choose either the periodic or the aperiodic CSI report obtained under a CSI process of some user, the sending eNB will have to drop available CSI reports. This would be unfortunate given that precious over-the-air signaling resources have already been spent in acquiring these reports and that these reports can together convey more CSI that either individual one.

Accepting this view an indexing scheme to enable this feature has been selected in [4].

We identify two corrections and an improvement that can be made to the selected scheme:

Correction: Changing the subband index range to (0, ... 27, ... } from {0, ..., 13, ...}:

A benefit that can be obtained from the subband indexing scheme of [4] is the simple forwarding of both aperiodic and periodic CSI reports in the same X2 message. Notice that the maxSubband value is 14 and the subband index range is defined to be {0, ..., 13, ...}. This choice allows for simple forwarding with any configured periodic mode and when the configured a-periodic mode is 3-*. This is because in these cases the maximum number of subband reports is 14 and the index range spans {0, ..., 13}, consistent with the agreed choice.

However, this choice will not allow the same X2 message to include aperiodic CSI report configured with feedback mode 2-* and periodic CSI report configured under any mode. This is because under aperiodic mode 2-*, when the total number of PRBs in the downlink is $N_{RB}^{DL}$=110, the subband size is k=4 and the number of UE selected subbands is M=6 (Table 7.2.1.5 in TS36.213). Thus, we have N=28 subbands (110=4*27+2) and the UE is free to select any 6 out of these 28 subbands as its preferred ones. Consequently, the subband index identifying each UE selected subband must belong to the set {0, ..., 27}.

Consequently, one of the two CSI process items should have a subband index range of {0, ..., 27}. For simplicity we suggest a common subband index range of {0, ..., 27} for both CSI process items. A slightly more efficient alternative could be where one of the two CSI process items (say CSI process item 1) has index range {0, ..., 27} whereas the other one has index range {0, ..., 13}.

2) Correction: Changing the semantic description to reflect that a different RI and CQI combination can be reported for each one of the two CSI process items under the same CSI process.

3) Improvement: Making the subband CQI IE optional with a clarification in the semantic description.

The subband CQIs are conveyed sequentially in the increasing order of subband indices. Then, in case the subband CQI IE for a subband is not conveyed, the receiving eNB must use the CQI conveyed for the last preceding subband. The CQI for the first subband must always be included. This approach can significantly save overhead by avoiding redundancy. Note that when a UE is configured in the aperiodic mode 2-*, it selects and reports indices for M out of N subbands. However, only one CQI (per codeword) is reported by it for all the M selected subbands. Therefore, it is beneficial that redundancy is avoided in reporting such CQIs in the X2 message as well.

H3. Conclusion

We identified three improvements that can be made in the UE-CSI IE and present them in a proposal.

9.2.aa UE-CSI Report

This IE provides CSI reports of UEs served by the cell for which the information is provided.

TABLE H1

| IE/Group Name | Presence | Range | IE type and reference | Semantics description |
|---|---|---|---|---|
| CSI Report per Cell | | 1 ... <maxUEReport> | | |
| >UE ID | M | | BIT STRING (SIZE(16)) | ID assigned by eNB2 for the UE. |
| >CSI Report per CSI Process | | 1 ... <maxCSIProcess> | | |
| >>CSI Process Configuration Index | M | | FFS | |
| >>CSI Report per CSI Process Item | | 1 ... <maxCSIReport> | | |
| >>>RI | M | | INTEGER (1 ... 8, ... ) | The RI corresponding to the CQI being reported for this CSI process Item. Value defined in TS 36.213 [11]. |
| >>>Wideband CQI | M | | 9.2.bb | |
| >>>Subband Size | M | | ENUMERATED (2, 3, 4, 6, 8, ... ) | Corresponds to a value of subband size k defined in TS 36.213 [11]for the system bandwidth $N_{RB}^{DL}$ |
| >>>Subband CQI List | | 0 ... <maxSubband> | | |
| >>>>Subband CQI | O | | 9.2.cc | If this IE is not present, the CQI is identical to the one provided for the last preceding subband. This IE is always present for the first subband in the list. |
| >>>>Subband Index | M | | INTEGER (0 ... 27, ... ) | |

TABLE H1-continued

| Range bound | Explanation |
| --- | --- |
| maxUEReport | Maximum number of UE. Value is 128. |
| maxCSIProcess | Maximum number of CSI processes per UE. The value is 4. |
| maxCSIReport | Maximum number of CSI Reports per CSI Process. The value is 2. |
| maxSubband | Maximum number of subbands. The value is 14. |

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A wireless communication method for a first base station supporting coordinated multi-point transmission and reception (CoMP) in a wireless communication system including the first base station and a second base station, the wireless communications method comprising:
   receiving, from the second base station, an information element (IE) indicating enhanced Relative Narrowband Tx (transmit) Power (eRNTP) and multiple eRNTP thresholds, the eRNTP being represented by a bitmap for each physical resource block (PRB) in the second base station; and
   performing interference aware scheduling based on the eRNTP,
   wherein:
     the bitmap is represented by any of {00, 01, 10, 11}, and
     each of the thresholds is represented by any of {−∞, −11, −10, −9, −8, −7, −6, −5, −4, −3, −2, −1, 0, 1, 2, 3},
   wherein the IE further includes:
     number of cell-specific antenna ports;
     physical downlink control channel (PDCCH) interference impact;
     starting system frame number (SFN); and
     starting subframe index, and
   wherein:
     a "00" value of the bitmap indicates not exceeding a first RNTP threshold,
     a "01" value of the bitmap indicates not exceeding a second RNTP threshold higher than the first RNTP threshold, and
     a "11" value of the bitmap indicates no promise on the Tx power is given.

2. A wireless communication method for a second base station supporting coordinated multi-point transmission and reception (CoMP) in a wireless communication system including a first base station and the second base station, the wireless communications method comprising:
   transmitting, to the first base station, an information element (IE) indicating enhanced Relative Narrowband Tx (transmit) Power (eRNTP) and multiple eRNTP thresholds, the eRNTP being represented by a bitmap for each physical resource block (PRB) in the second base station,
   wherein the first base station performs interference aware scheduling based on the eRNTP,
   wherein:
     the bitmap is represented by any of {00, 01, 10, 11}, and
     each of the thresholds is represented by any of {−∞, 11, −10, −9, 8, −7, −6, −5, −4, −3, −2, −1, 0, 1, 2, 3},
   wherein the IE further includes:
     number of cell-specific antenna ports;
     physical downlink control channel (PDCCH) interference impact;
     starting system frame number (SFN); and
     starting subframe index, and
   wherein:
     a "00" value of the bitmap indicates not exceeding a first RNTP threshold,
     a "01" value of the bitmap indicates not exceeding a second RNTP threshold higher than the first RNTP threshold, and
     a "11" value of the bitmap indicates no promise on the Tx power is given.

3. The wireless communication method of claim 2, further comprising:
   deciding the multiple RNTP thresholds.

4. A first base station supporting coordinated multi-point transmission and reception (CoMP) in a wireless communication system including the first base station and a second base station, the first base station comprising:
   a receiver to receive, from the second base station, an information element (IE) indicating enhanced Relative Narrowband Tx (transmit) Power (eRNTP) and multiple eRNTP thresholds, the eRNTP being represented by a bitmap for each physical resource block (PRB) in the second base station; and
   a controller to perform interference aware scheduling based on the eRNTP,
   wherein:
     the bitmap is represented by any of {00, 01, 10, 11}, and
     each of the thresholds is represented by any of {−∞, −11, −10, −9, −8, −7, −6, −5, −4, −3, −2, −1, 0, 1, 2, 3},
   wherein the IE further includes:
     number of cell-specific antenna ports;
     physical downlink control channel (PDCCH) interference impact;
     starting system frame number (SFN); and
     starting subframe index, and
   wherein:
     a "00" value of the bitmap indicates not exceeding a first RNTP threshold,
     a "01" value of the bitmap indicates not exceeding a second RNTP threshold higher than the first RNTP threshold, and a "11" value of the bitmap indicates no promise on the Tx power is given.

5. A second base station supporting coordinated multi-point transmission and reception (CoMP) in a wireless communication system including a first base station and the second base station, the second base station comprising:
a controller to decide enhanced Relative Narrowband Tx (transmit) Power (eRNTP) and multiple eRNTP thresholds, the eRNTP being represented by a bitmap for each physical resource block (PRB) in the second base station; and
a transmitter to transmit, to the first base station, an information element (IE) indicating the eRNTP and the multiple eRNTP thresholds,
wherein the first base station performs interference aware scheduling based on the eRNTP,
wherein:
the bitmap is represented by any of {00, 01, 10, 11}, and
each of the thresholds is represented by any of {−∞, −11, −10, −9, 8, −7, −6, −5, −4, −3, −2, −1, 0, 1, 2, 3},
wherein the IE further includes a single bitmap in which each position:
number of cell-specific antenna ports;
physical downlink control channel (PDCCH) interference impact;
starting system frame number (SFN); and
starting subframe index, and
wherein
a "00" value of the bitmap indicates not exceeding a first RNTP threshold,
a "01" value of the bitmap indicates not exceeding a second RNTP threshold higher than the first RNTP threshold, and
a "11" value of the bitmap indicates no promise on the Tx power is given.

6. A wireless communication method for a wireless communication system supporting coordinated multi-point transmission and reception (CoMP) and including a first base station and a second base station, the wireless communication method comprising:
transmitting, from the second base station to the first base station, an information element (IE) indicating enhanced Relative Narrowband Tx (transmit) Power eRNTP and eRNTP thresholds, the eRNTP being represented by a bitmap for each physical resource block (PRB) in the second base station; and
performing, at the first base station, interference aware scheduling based on the eRNTP,
wherein:
the bitmap is represented by any of {00, 01, 10, 11}, and
each of the thresholds is represented by any of {−∞, −11, −10, −9, −8, −7, −6, −5, −4, −3, −2, −1, 0, 1, 2, 3},
wherein the IE further includes:
number of cell-specific antenna ports;
physical downlink control channel (PDCCH) interference impact;
starting system frame number (SFN); and
starting subframe index, and
wherein:
a "00" value of the bitmap indicates not exceeding a first RNTP threshold,
a "01" value of the bitmap indicates not exceeding a second RNTP threshold higher than the first RNTP threshold, and
a "11" value of the bitmap indicates no promise on the Tx power is given.

7. A wireless communication system supporting coordinated multi-point transmission and reception (CoMP), the wireless communication system comprising:
a first base station; and
a second base station transmitting, to the first base station, an information element (IE) indicating enhanced Relative Narrowband Tx (transmit) Power eRNTP and multiple eRNTP thresholds, the eRNTP being represented by a bitmap for each physical resource block (PRB) in the second base station,
wherein the first base station performs interference aware scheduling based on the eRNTP,
wherein:
the bitmap is represented by any of {00, 01, 10, 11}, and
each of the thresholds is represented by any of {−∞, −11, −10, −9, −8, −7, −6, −5, −4, −3, −2, −1, 0, 1, 2, 3},
wherein the IE further includes:
number of cell-specific antenna ports;
physical downlink control channel (PDCCH) interference impact;
starting system frame number (SFN); and
starting subframe index, and
wherein:
a "00" value of the bitmap indicates not exceeding a first RNTP threshold,
a "01" value of the bitmap indicates not exceeding a second RNTP threshold higher than the first RNTP threshold, and
a "11" value of the bitmap indicates no promise on the Tx power is given.

8. A user equipment (UE) used in a wireless communication system including a first base station and a second base station, the UE comprising:
a receiver configured to receive, from the first base station, a reference signal; and
a transmitter configured to transmit, to the first base station, information of received power,
wherein the receiver further configured to receive, from the first base station, a downlink signal in each physical resource block (PRB) with a transmission power determined by the first base station based on the information,
wherein the determined transmission power is reported, to the second base station, as an information element (IE) for interference scheduling, the IE indicating enhanced Relative Narrowband Tx (transmit) Power (eRNTP) and multiple eRNTP thresholds,
wherein the eRNTP is represented by a bitmap for each PRB in the first base station,
wherein the bitmap is represented by any of {00, 01, 10, 11}, a "00" value of the bitmap indicating not exceeding a first RNTP threshold, a "01" value of the bitmap indicating not exceeding a second RNTP threshold higher than the first RNTP threshold, and a "11" value of the bitmap indicates no promise on the Tx power is given,
wherein each of the thresholds being represented by any of {−∞, −11, −10, 9, −8, −7, −6, −5, −4, −3, −2, −1, 0, 1, 2, 3}, and
wherein the IE further includes number of cell-specific antenna ports, physical downlink control channel (PD- CCH) interference impact, starting system frame number (SFN), and starting subframe index.

9. A communication method implemented in a user equipment (UE) used in a wireless communication system including a first base station and a second base station, the communication method comprising:
   receiving, from the first base station, a reference signal;
   transmitting, to the first base station, information of received power; and
   receiving, from the first base station, a downlink signal in each physical resource block (PRB) with a transmission power determined by the first base station based on the information,
   wherein the determined transmission power is reported, to the second base station, as an information element (IE) for interference scheduling, the IE indicating enhanced Relative Narrowband Tx (transmit) Power (eRNTP) and multiple eRNTP thresholds,
   wherein the eRNTP is represented by a bitmap for each physical resource block (PRB) in the first base station,
   wherein the bitmap is represented by any of {00, 01, 10, 11}, a "00" value of the bitmap indicating not exceeding a first RNTP threshold, a "01" value of the bitmap indicating not exceeding a second RNTP threshold higher than the first RNTP threshold, and a "11" value of the bitmap indicates no promise on the Tx power is given,
   wherein each of the thresholds being represented by any of $\{-\infty, -11, -10, 9, -8, -7, -6, -5, -4, -3, -2, -1, 0, 1, 2, 3\}$, and
   wherein the IE further includes number of cell-specific antenna ports, physical downlink control channel (PDCCH) interference impact, starting system frame number (SFN), and starting subframe index.

* * * * *

UNITED STATES PATENT AND TRADEMARK OFFICE
CERTIFICATE OF CORRECTION

PATENT NO. : 10,230,507 B2
APPLICATION NO. : 14/856292
DATED : March 12, 2019
INVENTOR(S) : Prasad et al.

Page 1 of 1

It is certified that error appears in the above-identified patent and that said Letters Patent is hereby corrected as shown below:

In the Claims

Claim 2, Column 126, Line 20, "-9, 8, -7," should read -- -9, -8, -7, --.

Claim 5, Column 127, Line 22, "-9, 8, -7," should read -- -9, -8, -7, --.

Claim 5, Column 127, Lines 24-25, after "the IE further includes" delete "a single bitmap in which each position".

Claim 8, Column 128, Line 64, "-10, 9, -8," should read -- -10, -9, -8, --.

Claim 9, Column 130, Line 11, "-10, 9, -8," should read -- -10, -9, -8, --.

Signed and Sealed this
Sixteenth Day of July, 2019

Andrei Iancu
*Director of the United States Patent and Trademark Office*